US010147264B1

(12) United States Patent
Halvorson

(10) Patent No.: US 10,147,264 B1
(45) Date of Patent: Dec. 4, 2018

(54) GAMING SYSTEM AND METHOD HAVING MIXED LINE TRIGGERS AND PAYOUTS

(71) Applicant: ADP GAUSELMANN GMBH, Espelkamp (DE)

(72) Inventor: Michael Charles Halvorson, Las Vegas, NV (US)

(73) Assignee: ADP GAUSELMANN GMBH, Espelkamp (DE)

( * ) Notice: Subject to any disclaimer, the term of this patent is extended or adjusted under 35 U.S.C. 154(b) by 0 days.

(21) Appl. No.: 15/858,083

(22) Filed: Dec. 29, 2017

(51) Int. Cl.
*A63F 13/00* (2014.01)
*G07F 17/32* (2006.01)
*G07F 17/34* (2006.01)

(52) U.S. Cl.
CPC ...... *G07F 17/3213* (2013.01); *G07F 17/3216* (2013.01); *G07F 17/3244* (2013.01); *G07F 17/3267* (2013.01); *G07F 17/34* (2013.01)

(58) Field of Classification Search
None
See application file for complete search history.

(56) References Cited

U.S. PATENT DOCUMENTS

2008/0200235 A1* 8/2008 Yoshizawa .......... G07F 17/3267 463/20
2013/0165204 A1* 6/2013 Smikun ................. G07F 17/326 463/20
2014/0274288 A1* 9/2014 Hornik .................... G07F 17/34 463/20
2014/0349737 A1* 11/2014 Meyer ................... G07F 17/326 463/20
2015/0065224 A1* 3/2015 Aoki ....................... G07F 17/34 463/20
2017/0213416 A1* 7/2017 Wortmann .......... G07F 17/3213

* cited by examiner

*Primary Examiner* — Lawrence Galka
(74) *Attorney, Agent, or Firm* — Resolute Legal PLLC

(57) ABSTRACT

Various embodiments of a gaming system and method are disclosed as having one or more scatter symbols that may trigger one or more game functions and result in payout awards. For example, the scatter symbols may trigger a game feature when the gaming system generates a predetermined quantity of the scatter symbols for a play of a game in any visible symbol areas. The scatter symbols may also result in payout awards when the scatter symbols are generated in certain symbol areas relative to other each other. In one embodiment, the certain symbol areas relative to each other may include visible adjacent symbol areas across reels along a wagered pay line. In one embodiment, the gaming system may provide the payout awards based on the designated symbols when the same scatter symbols or a mix of different scatter symbols are generated in certain symbol areas relative to each other.

16 Claims, 15 Drawing Sheets

FIG. 4D

GAMING SYSTEM AND METHOD HAVING MIXED LINE TRIGGERS AND PAYOUTS

FIELD OF THE INVENTION

The present disclosure relates to gaming devices.

SUMMARY OF THE INVENTION

Various embodiments of a gaming system and method are disclosed as having one or more designated symbols that may trigger one or more game functions and result in payout awards. For example, the designated symbols may trigger a game feature when the gaming system generates a predetermined quantity of the designated symbols for a play of a game in any visible symbol positions. The designated symbols may also result in payout awards when the designated symbols are generated in certain symbol positions relative to other each other. In one embodiment, the certain symbol positions relative to other each may include visible adjacent symbol positions across reels along a wagered pay line. In one embodiment, the gaming system may provide the payout awards based on the designated symbols when the same designated symbols or a mix of different designated symbols are generated in certain symbol positions relative to each other.

In one embodiment, the gaming system includes a set of symbols. The set of symbols includes a plurality of different symbols. One or more of the symbols are designated as scatter symbols. Scatter symbols are symbols that do not have to be generated on one pay line with other scatter symbols to be combined to form a winning scatter symbol combination. That is, a gaming system can generate the scatter symbols for any visible symbol position and still form a winning symbol combination, even when the visible symbol positions are not adjacent and even when the generated scatter symbols are not on the same pay line. In one embodiment, a winning scatter symbol combination triggers a game feature such as a bonus game. In one such embodiment, the bonus game may include a predetermined or randomly generated quantity of free spins in the bonus game. In one embodiment, a winning scatter symbol combination may trigger a payout multiplier, such as a 3× multiplier. In one embodiment, a winning scatter symbol combination may result in a payout award when combined with other generated scatter symbols along a wagered pay line. In one such embodiment, a winning scatter symbol combination may include the same scatter symbol or two or more different scatter symbols generated along a wagered pay line. It should be appreciated that scatter symbols may be associated with any suitable combination of features in a game.

During a play of a game, the gaming system randomly generates a plurality of symbols from the set of symbols. The gaming system also displays the generated plurality of symbols. The gaming system evaluates the generated plurality of symbols for winning symbol combinations. For example, the gaming system may evaluate if a predetermined quantity of one symbol was generated in adjacent reel symbol positions across any wagered pay lines. The gaming system may also evaluate if a predetermined quantity of scatter symbols was generated in adjacent reel symbol positions across any wagered pay lines. In one embodiment, a predetermined quantity of the same scatter symbol generated in adjacent reel symbol positions across any wagered pay lines results in a payout award. In another embodiment, a predetermined quantity of two of more different scatter symbols generated in adjacent reel symbols positions across any wagered pay lines results in a payout award. The gaming system determines a payout amount based on winning symbol combinations along wagered pay lines. The payout amount determination further includes payout amounts for winning scatter symbol combinations across wagered pay lines. In an embodiment where winning scatter symbol combinations trigger a payout multiplier, the gaming system may further determine the payout amount based on the payout multiplier triggered by the winning combination of scatter symbols.

In one embodiment, the gaming system further evaluates if any generated combinations of scatter symbols trigger a bonus game. In one embodiment, the gaming system may further determine if any combinations of scatter symbols results in an award of free spins in the bonus game. If the gaming system determines that one or more combinations of scatter symbols triggers a bonus game, the gaming system executes the bonus game. If the player obtained free spins, the gaming system enables the player to use the free spins during the bonus game.

It should be appreciated that a gaming system and method with scatter symbols that can provide game triggering events and mixed line payouts creates new ways for a player to obtain winning symbol combinations with a potential to earn greater awards. The new winning symbol combinations and potential to earn greater awards creates a greatly improved sense of anticipation for players.

DETAILED DESCRIPTION OF THE INVENTION

Various embodiments of a gaming system and method are disclosed as having designated symbols that can provide game triggering events and line payouts (including same symbol and mixed symbol line payouts).

In one embodiment, the designated symbols may trigger a game feature when the gaming system generates a predetermined quantity of the designated symbols in visible symbol positions. The triggering event can be independent of any wagered pay line, for a play of a game. The designated symbols may also result in payout awards when the designated symbols are generated in certain symbol positions relative to other each other. In one embodiment, the certain symbol positions relative to other each may include visible adjacent symbol positions across reels along a wagered pay line. In one embodiment, the gaming system may provide the payout awards based on the designated symbols when the same designated symbols or a mix of different designated symbols are generated in certain symbol positions relative to each other.

In one embodiment, the gaming system includes a set of symbols. The set of symbols includes a plurality of different symbols. One or more of the symbols are designated as scatter symbols. Scatter symbols are symbols that do not have to be generated on one pay line with other scatter symbols to be combined to form a winning scatter symbol combination. That is, a predetermined number of scatter symbols can be generated in any visible symbol position and still form a winning scatter symbol combination. In one embodiment, a winning scatter symbol combination triggers a game feature such as a bonus game. In one such embodiment, the bonus game may include a predetermined or randomly generated quantity of free spins for the bonus game. In one embodiment, a winning scatter symbol combination may trigger a payout multiplier, such as a 3× multiplier. However, it should be appreciated that any suitable multiplier or no multiplier may be used. In one embodiment, a winning scatter symbol combination may result in a payout award when combined with other generated scatter symbols along a wagered pay line. In one such embodiment, a winning scatter symbol combination may include the same scatter symbol or two or more different scatter symbols generated along a wagered pay line. It should be appreciated that scatter symbols may be associated with any suitable combination of features in a game.

Gaming Device Platform

The features and advantages of the gaming system and method described herein may be provided to a player via a gaming device platform that includes various structures and components for allowing player interaction with the gaming device. While only one gaming device platform will be described in detail herein, the features, objects, and advantages of the gaming system described herein may be implemented in one or more alternative gaming device platforms.

Figure 1:
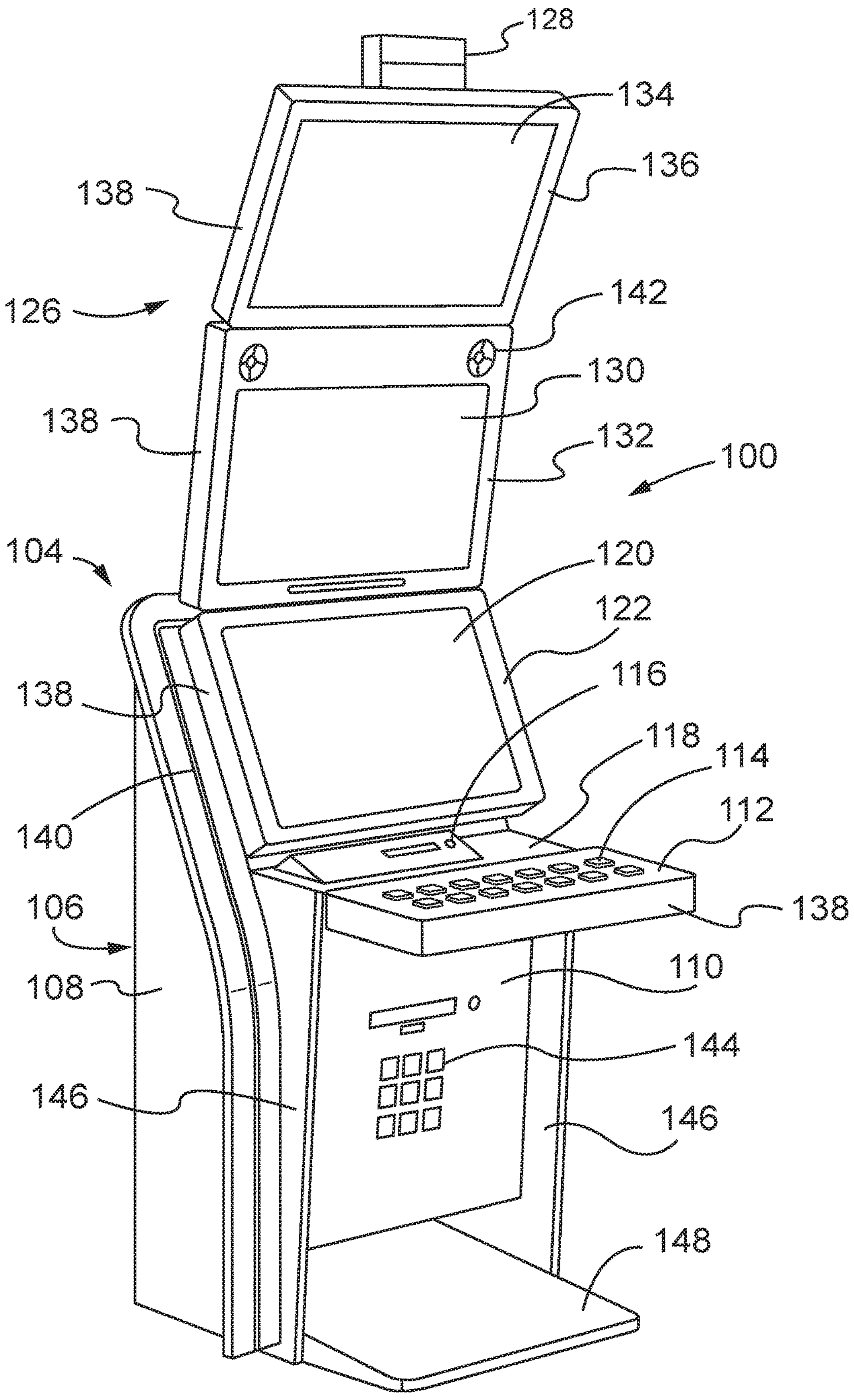
FIG. 1 is a perspective view of one embodiment of a stand-alone gaming device of a gaming system.

One embodiment of a gaming device platform is shown in FIG. 1 where a gaming device 100 is generally shown. In one embodiment, the gaming device 100 is referred to as a slot machine and is illustrated as housed in a housing or cabinet constructed so that a player can operate and play the gaming device 100 while standing or sitting.

Gaming device 100 may include cabinet 104 for housing the components fully described hereinbelow. The cabinet 104 has a lower cabinet body portion 106 which includes a pair of cabinet side panels 108 (only one of which is viewable in the perspective view of FIG. 1), front panel 110, and a rear panel (not shown). A base panel (not shown) and a top panel surface (not shown) that supports first game display 120 and the player interaction area 112, are provided. The cabinet panels are interconnected along their edges and cooperate to form a cabinet enclosure for housing the gaming device, as can be seen in FIG. 1.

It should be appreciated that a wide variety of cabinet enclosure sizes, shapes, and designs are possible for the gaming device 100. Cabinet 104 may function to securely protect any local control system, technology components, and provide support for game display(s) and player input and output interactions with the gaming device.

Returning to FIG. 1, the gaming device enables the player to interact with the gaming device 100 to direct the wagering and game play activities and preferences. Various forms of player interaction devices and activities will now be described.

Cabinet 104 includes a player interaction area having input and output areas generally designated as 112. The player interaction area 112 may be located on the front top side of cabinet 104 and, as shown, on a panel structure that extends outwardly from the gaming device in a player's direction. Player interaction area 112 may contain a plurality of player input and output structures such as player control button area 114, player value acceptor and dispenser area 116, and player convenience input area 118.

Player control button area 114 includes a plurality of buttons, touch sensitive areas, or both through with which players may interact with the one or more processors of gaming device 100 and direct game play. It is expected that cabinet 104 provides an easily accessible location and support for all necessary player input/output (I/O) interactions with the device, including gaming control interactions and value wagering interactions. Although the gaming device 100 illustrated in FIG. 1 shows player controls provided by buttons of player control button area 114, it is understood that in one embodiment, a player's gaming control interactions could be made by either buttons mounted on cabinet 104 or "soft" buttons located on the gaming display and activated by player touch (e.g., touch screen interfaces), or a combination of both arrangements.

Player control button area 114 may include, for example: game selection button(s) in any embodiments where more than one game is provided in a single gaming device; gaming denomination value selection button(s) in any embodiments where one or more wagering denomination value is accommodated; wager selection button(s) for the player to indicate or select the desired wager value for a game in any embodiments where a selection of wager values are offered; pay line selection button(s) for selecting the number of active pay lines in game embodiments that provide multiple pay line wagering; a reel spin button for players to initiate one or more reels to spin in a game; a repeat last bet button for players to conveniently repeat the last game's preference and wager selections in a new game; a cash-out button for player extraction of gaming device credits; an attendant call button; and gaming device information buttons such as show pay tables, show game rules, or show other game-related information. As discussed above, the functions of the buttons in player control button area 114 may be duplicated with soft buttons in the player control button area 114 or as soft buttons in other areas of the gaming device 100 (e.g., as a touch screen overlay over available game displays).

Gaming device 100 may include one or more forms of value acceptance and value distribution to allow the player to interact with the device and to risk or otherwise place a wager (a monetary value) on one or more outcomes of a game. Winnings may be returned to the player via some form of value distribution. As illustrated in FIG. 1, player value acceptor and dispenser area 116 is provided. In the player value acceptor and dispenser area 116, a player supplies monetary value to the gaming device 100 via one or more value acceptor devices. In one embodiment, the player value acceptor and dispenser area 116 (through the one or more value acceptor devices) may accept any one or more of the following from a player to establish a gaming credit balance: coins, bills, tokens, tickets/vouchers, player ID cards, credit cards, or other suitable forms of value. Thus, if the gaming device 100 accepts coins and bill, the gaming device 100 includes a currency bill validator and a coin validator as the value acceptor devices. Likewise, if the gaming device 100 accepts tickets, the gaming device includes a ticket acceptor as a value acceptor device for receiving tickets or vouchers representing some monetary value. The ticket acceptor may include a bar code reader, or other appropriate code reader, for reading the encoded value contained by the player's ticket or voucher. In some embodiments, the player value acceptor and dispenser area 116 may include a value acceptor device that can accept more than one type of value. In some embodiments, the player value acceptor and dispenser area 116 may include multiple different value acceptor devices to accept different types of value from players Upon receipt of some type of value from the player, a value acceptor device of the player value acceptor and dispenser area 116 performs validation on the player supplied value using appropriate hardware readers (e.g., determining that the currency bills/coins/tokens are genuine or the ticket/voucher is genuine). If the validation result is positive on player supplied value, the appropriate value acceptor device generates a signal to a processor of the gaming device 100 to establish a gaming credit balance for plays of one or more games on gaming device 100.

In one embodiment, a player receives monetary value, or a representation thereof, from the gaming device 100 when a player chooses to "cash out" the gaming credit balance (e.g., remove value from the gaming device 100). The player can cash out at any suitable time. When a player cashes out the value contained on a credit meter (not shown) of gaming device 100, a processor of gaming device 100 may cause a printer of gaming device 100 to print and dispense a coded ticket or voucher through a dispensing slot to the player. The coded ticket or voucher may be a bar-coded ticket or any other suitable code (PDF417 coding or quick response (QR) coding). This ticket can then be used as value input at another gaming device, or converted to currency at a conveniently located kiosk or cashier counter located near the gaming device. Alternatively, the processor of gaming device 100 may cause a currency bill dispenser or a coin dispenser in gaming device 100 to dispense the value contained on the credit meter of gaming device 100.

Various combinations of the above value acceptance and value distribution arrangements are possible. Gaming device 100 may include other value acceptance and value distribution mechanisms in the player value acceptor and dispenser area 116. For example, gaming device 100 may include a magnetic strip or chip card reader/writer in order to accept value from and transfer value to a magnetic strip or an embedded chip card. In other embodiments, hardware for transferring (and receiving) non-traditional currencies to players such as digital currencies (e.g., bitcoin) may be included in gaming device 100.

In an alternative embodiment, gaming device 100 may include a card reader (not illustrated) in the in the player value acceptor and dispenser area 116, which accepts and reads any of a variety of magnetic strip or imbedded chip smart cards that convey machine readable information. The card reader reads inserted cards, in the case of wagering, for the credit information of the player for cashless gaming. The card reader may, for player loyalty programs, utilize the information on the card to identify the player account associated with the card so the gaming activity on the gaming device may be associated with the player account. It is noted that a numeric or alphanumeric keypad may be provided adjacent to the card reader slot to enable player entry of a personal identification number or the like for secure access to card information.

In one embodiment, a player convenience input area 118 may be included in the gaming device 100, as is shown in FIG. 1. In various embodiments, player convenience input area 118 may have a variety of features and functions depending on the jurisdictional deployment of the gaming device 100. In one embodiment, the player convenience input area 118 will house a magnetic strip card reader (not illustrated), integrated circuit chip card reader (not illustrated), or both, for reading cards associated with a player loyalty program. Player loyalty programs, also referred to as player tracking systems, provide magnetic strip or chip cards to players for insertion into a gaming device during play. These player loyalty/player tracking cards are associated with a player account and are utilized by the card-issuing entity to monitor, or track a player's gaming activity and build loyalty through player rewards of a variety of types. The player convenience input area 118 may include an input mechanism such as input buttons so that a player may input a personal identification number or other require player information associated with the player tracking card. Further, the input mechanism may also include a small display utilized to communicate player information to the player such as the player's current loyalty rewards.

In certain embodiments, the player convenience input area 118 may include player convenience features such as a pocket for storage that allows players to store their personal items such as a mobile phone. Gaming device 100 may include one or more universal serial bus (USB) ports that enables a player to charge their electronics or connect to services such as the Internet or food service. Further, player convenience input area 118 of gaming device 100 may include buttons to request food or drink service if the gaming device is located in an establishment that has food and drink service. The gaming device 100 may be connected to a local or wide area network such that selection of the requested food or drink service will alert the establishment's hospitality staff to deliver the requested service directly to the gaming device 100.

The layout of the player control button area 114, player value acceptor and dispenser area 116 and the player convenience input area 118 in gaming device 100 may be arranged differently than those disclosed and illustrated herein. The selections and arrangement of input locations on the cabinet 104 may be dependent upon the game buttons, the type of value wagered, and the player conveniences utilized in the deployment configuration of gaming device 100.

With continuing reference to FIG. 1, in one embodiment, lower cabinet body portion 106 includes a first game display 120 mounted atop or flush with the lower cabinet body portion's top panel surface. First game display 120 is, for example, a 27-inch liquid crystal display (LCD) display mounted in a widescreen orientation. However, any suitable display may be used in any suitable orientation. In the illustrated embodiment, the first game display 120 is mounted within and framed by first display frame 122 which is, in turn, mounted upon lower cabinet body portion's top panel surface. In this manner, the first game display 120 is both surrounded and secured within the first display frame 122 and raised above the cabinet's top panel surface. Additional features of the first display frame 122 will be described below. In one embodiment, gaming device 100 may use one first game display 120 and not include additional game displays (not illustrated).

The lower cabinet body portion 106 is further constructed to support upper cabinet portion 126. Upper cabinet portion 126 may be comprised of an upwardly extending support structure (not illustrated) that extends upwardly from the rear side of lower cabinet body portion 106 and is sufficiently strong to support one or more additional game displays.

At the topmost end of the support structure, a cabinet top light 128 may be provided. The cabinet top light 128 is capable of illumination in a variety of colors and is utilized to indicate and communicate gaming device conditions to gaming players and service personnel.

Further, the upper cabinet portion support structure may conceal power and communication lines between (1) the control systems and components located within the lower cabinet body portion 106 and (2) the displays mounted on the upper cabinet portion 126 support structure.

In one embodiment, as illustrated in FIG. 1, gaming device 100 includes two additional displays, second game display 130 and third game display 134. Second game display 130 and third game display 134 are disposed generally in a vertical relationship and generally in alignment with the first game display 120. Like the first game display 120, second game display 130 and third game display 134 can be 27-inch LCD displays and can be mounted in a widescreen orientation in one embodiment. However, any suitable display in any suitable orientation may be used for the second game display 130 and the third game display 134. Further, like the first game display 120, second game display 130 and third game display 134 can be mounted within and framed by second display frame 132 and third display frame 136, respectively. Second display frame 132 and third display frame 136 are attached to the upper cabinet support structure and can protect the second game display 130 and the third game display 134.

First game display 120, second game display 130, and third game display 134 can be disposed at an angle from each other to form a player-facing concave arc. However, in some embodiments, the angles between the displays may be adjustable and may be smaller or greater than the angles illustrated in FIG. 1. Further, it is understood that in some embodiments the displays may be disposed in a common plane relative to each other.

It also should be appreciated that in various embodiments a variety of display technology may be utilized equivalently and interchangeably with a variety of embodiments of the gaming device. Equivalent display devices include all variations of liquid crystal displays, light emitting diode displays, and plasma displays.

In some embodiments, different sized displays may be combined to display gaming data on gaming device 100. As a non-limiting example, a 27-inch widescreen LCD display may be combined with a 20-inch portrait oriented LCD or a light emitting diode (LED) display. This combination may be used, for example, with a third scrolling banner LED display. In alternative embodiments, one, two, three, or more displays could be used in a variety of positions and orientations. Any suitable combination may be used. It should also be appreciated that a processor of gaming device 100 may communicate with the disclosed first game display 120, second game display 130, and third game display 134 through a video card of gaming device 100 to produce the visible aspects of a game.

In one embodiment, one or more of the first game display 120, second game display 130, and third game display 134 may be fitted with a transparent touch sensitive overlay for sensing player touch inputs into the gaming device. Touch sensitive overlays can communicate with a processor of gaming device 100 to enable the player to interact with the game.

In some embodiments, the curved displays may be used for any or all of the first game display 120, second game display 130, or third game display 134. Similarly, any of the displays used for gaming device 100 can be based on flexible display technologies. For example, it is possible to utilize flexible display technologies to create uniquely shaped curving, wavy, or tubular display structures to provide one or more of the first game display 120, second game display 130, and third game display 134. Additionally, in one embodiment flexible display technologies can be used in combination with fixed flat screen technologies.

While the gaming device 100 has been described as implemented with video technologies, in one embodiment, mechanical reels with reel strips containing game indicia and step motor controllers may be employed to provide game information to a player. In one embodiment, the reel strips may include a plurality of printed symbols. In another embodiment, the mechanical reels may include flexible video display technology as the reel strips on mechanical reels. Thus, games implemented in video form can readily be implemented with mechanical reels utilizing such display technology. Alternatively, in other embodiments mechanical reels with reels strips having fixed symbols displayed along the reel strip could be used to implement the game.

Dependent upon the particular gaming device housing style, a variety of other display technologies may be utilized in combination with the gaming device disclosed herein. For example, in some embodiments a gaming device may have one or more display devices in addition to the main game display(s). For example, the gaming device may include a player tracking device having a player tracking display which displays various information to the player regarding the player's status. The gaming device may also include other game-related displays such as the wager display and the gaming credit balance display. These additional game-related displays may be separate display devices or may be displayed on any one or more of the first game display 120, the second game display 130, or the third game display 134.

Cabinet lighting design functions to attract players to a gaming device 100. In the embodiment of FIG. 1, attractive cabinet lighting is provided by frame accent lighting 138. It is noted that frame accent lighting 138 is a common structure found on each of the first display frame 122, the second display frame 132, and the third display frame 136 and player interaction area 112. Example areas where frame accent lighting is applied to gaming device 100 are commonly designated as frame accent lighting 138.

Frame accent lighting 138 may have multiple components. The side edge pieces of first display frame 122, second display frame 132, third display frame 136, and the edge structure of player interaction area 112 can be made of a translucent or transparent plastic or other suitable materials. Linear arrays, or strips, of light emitting diodes (LEDs) (not shown) on circuit boards may be mounted below the translucent or transparent plastic side edge pieces 138. In one embodiment, the circuit boards are flexible circuit boards. These LED strips and transparent or translucent coverings may surround one or more gaming device displays frames, as well as the player interaction area, to highlight these areas.

In one embodiment, the individual LEDs mounted on the LED strips are of a type that can emit red, green, and blue light. In an alternative embodiment, separate LEDs are used for each required light color. All LED strips can be electrically connected and can be controlled by a cabinet lighting controller 218 (illustrated in FIG. 2) in conjunction with a processor of gaming device 100 to selectively mix the emitted light colors in a manner to create any color. The cabinet lighting controller 218 can flash and vary lighting as desired. For example, cabinet edge lighting can change and flash in combination with music rhythms or in combination with game events. Other variations are possible.

In some embodiments, cabinet 104 may include LED strip lighting or LED rope lighting to accentuate the cabinet and enhance the attractiveness of gaming device 100 to players. LED rope lighting is a plurality of small light-emitting diode bulbs linked together and encased in a plastic, polyvinyl-chloride, or other suitable material to create a string of lights. For example, in the embodiment of FIG. 1, cabinet 104 includes cabinet accent lighting 140. In one embodiment, cabinet accent lighting 140 is LED rope lighting mounted flush with the front side edge of the cabinet side panels 108. The LED rope lighting can generate any of suitable colors, and are controlled by cabinet lighting controller 218 and a processor of gaming device 100 to selectively mix the emitted light colors in a manner to create any color in the same manner as the frame edge lighting.

In various embodiments, gaming device 100 includes one or more audio speakers and appropriate driving electronics and sound cards so that game players may experience pleasing audio aspects of the gaming device 100. Audio is desirable to attract and maintain player interest in gaming device 100. Gaming device 100 may also emit attraction sounds during any idle period of gaming device 100. Game audio may add to the player's enjoyment of gaming device 100 by providing music and sound effects designed to enhance and compliment the gaming experience.

Audio speaker hardware may include one or more speakers disposed in or on the cabinet 104 of gaming device 100. In FIG. 1, a pair of audio speakers 142 are shown mounted on the upper corners of second display frame 132. Any suitable number of additional speakers may be provided on additional display frames or on the lower cabinet body portion 106 as desired.

Speakers designed for emitting bass vibrations may be included in some embodiments. Speaker placement may be selected to enhance the sound emitting characteristics of the gaming device. For example, bass speakers or additional speakers 144 may be mounted inside lower cabinet body portion 106. Further, it is envisioned that in some embodiments sound processing such as multichannel processing and surround sound processing are included in gaming device 100. Audio jacks for attachment of player headphones may also be provided in some embodiments of gaming device 100 for the player to further enhance the audio experience of the game and also to block out noise from other gaming devices.

In one embodiment, front panel 110 of lower cabinet body portion 106 includes a locked removable panel or locked door (not shown), which can be opened for access to internal control system and technology components that are housed within lower cabinet body portion 106 (discussed hereinbelow with respect to FIG. 2). Front panel 110 may be flanked on vertical sides by cabinet side panel extensions 146 which serve to define a space below player interaction area 112 for players to place their feet and legs while they are playing gaming device 100 in a seated position. Foot rest 148, which may be cushioned, is provided below player interaction area 112 to enhance a player's ergonomic comfort while playing gaming device 100. In one embodiment, the edges of player interaction area 112 may be ergonomically cushioned as well.

Gaming device 100 may be embodied in alternative gaming device housing forms and styles. For example, the housing may have fewer or greater number of display areas for displaying the game and game-related information to the player. If multiple displays are used, the displays may be of similar size, shape, and orientation or the displays may be divergent from each other in one or more of their respective descriptive characteristics. The one or more displays can be supported by, mounted upon, or housed within a cabinet 104 which can comprise a variety of shapes, sizes, and forms. The cabinet 104 can 1) protect and house the operational electronics, 2) adequately support the display(s) in a position easily viewable for a seated or standing player, as necessary 3) provide an easy location and support for all necessary player input/output (I/O) interactions, including gaming control interactions and value wagering interactions. For example, in some embodiments the gaming device 100 may be disposed in a housing style referred to as a "slant top" gaming device that is designed to be operated with the player comfortably seated. In this arrangement, generally, the gaming display(s) and all player I/O controls are located on a low, wide, surface that extends forwardly from the player on a horizontal plane and then slopes upwardly and away from the player's seated location.

In one embodiment, housing styles of cabinet 104 of gaming device 100 may include bar top or table top housing arrangements. These housings are generally small enough to be placed on top of an existing bar or table while providing the requisite gaming device housing functions of protection of/access to gaming electronics, displays, and player I/O functions described above.

In one embodiment, cabinet 104 may be an embedded housing. Embedded housings are built into structures designed to otherwise function as bars or tables in a gaming environment. Displays may be integral with the bar top or table top surface or the entire unit may be contained below a transparent bar or table top surface while controls are disposed on the lower front or side of the bar or table.

Figure 2:
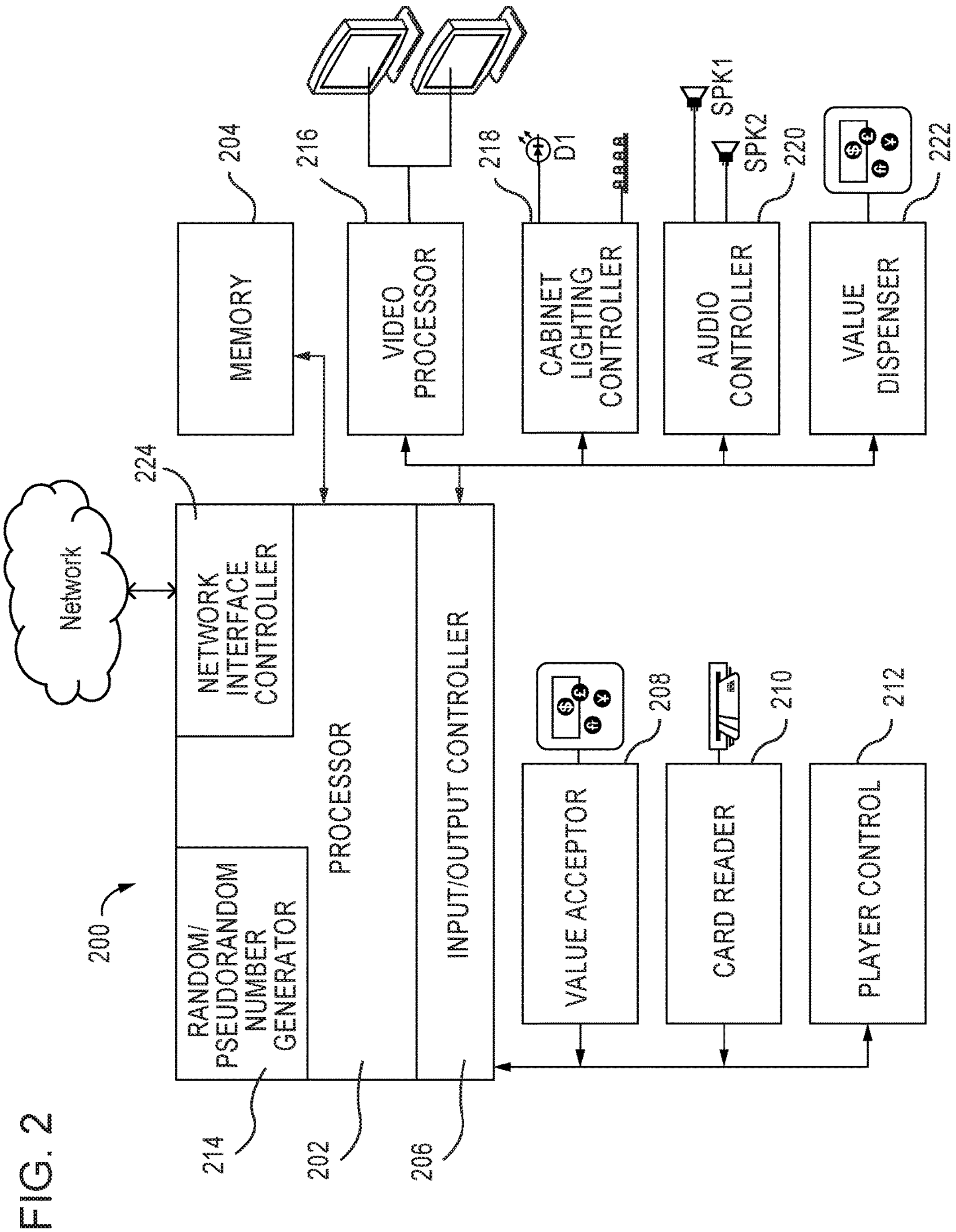
FIG. 2 is a functional block diagram of the gaming device technology components of the gaming system.

Turning now to FIG. 2, the features and advantages of the gaming system described above will now be described in terms of the various technology components for allowing player interaction with the gaming device 100.

FIG. 2 illustrates a functional block diagram of an embodiment of technology components of gaming device 100 that are specially configured to carry out the game function and operations described herein. The functional elements shown in FIG. 2 cooperate, on a broad and general level, to function as gaming device 100. The subject matter and functional operations described in relation to FIG. 2 can be embodied in hardware, software, or a combination thereof. Described hardware includes the structures described and their functional or operational equivalents. Described functions may be performed by hardware, digital circuitry, computer software, computer firmware, or functionally equivalent combinations thereof.

In one embodiment, gaming device 100 is functionally controlled by control unit 200. Control unit 200 is specifically configured and functions to perform all aspects of operations for providing the game. Control unit 200 includes at least one specially configured processor and at least one controller configured to operate with at least one memory device and at least one data storage device, at least one input device, and at least one output device. In one embodiment, control unit is also configured to communicate with a server device through a network.

In one embodiment, control unit 200 includes at least one specially configured processor 202 or central processing unit (CPU). In one embodiment, specially configured processor 202 include arithmetic logic units and math co-processors also known as floating point units. In one embodiment, specially configured processor 202 includes registers for holding instructions or other data, and cache memory for storing data for faster operation thereupon. In one embodiment, specially configured processor 202 may be a multicore processor that includes two or more processors for enhanced performance, more efficient parallel processing, or other advantageous computing functions. In another embodiment, specially configured processor 202 may be one or more processing devices such as microprocessor(s) or integrated circuit(s) and may include one or more controllers. It should be appreciated that in some embodiments, a general purpose processor could be programmed to perform the functions of specially configured processor 202.

A controller, in one embodiment, is a device or a software program that manages or directs the flow of data between two entities. Often, controllers are special purpose circuitry or software that solve a technical communications problem between different technology systems. In one embodiment, a controller functions as an interface between two systems while managing the communications between the systems. In another embodiment, a controller functions as an interface between a processor and a peripheral device and functions to control the peripheral device.

At least one specially configured processor 202 or controller of control unit 200 is specially configured to communicate with at least one memory device, generally shown as memory device 204 in FIG. 2. In one embodiment, memory device 204 includes one or more memory structures for storing instructions and various types of game data. Memory structures include one or more random access memory units (RAMs) units, one or more read only memory units (ROMs), one or more flash memory units including solid state drives (SSDs), one or more electrically erasable/programmable read only memory units (EEPROMs).

It should be appreciated that in one embodiment, communication with a memory device by a processor or a controller encompasses the processor or controller accessing the memory device, exchanging data with the memory device, or storing data to the memory device.

Memory device 204 may store all program code and game code (collectively the "code"), and operation data necessary for the operation of the gaming device 100 and execution of the gaming features described hereinbelow. In an alternative embodiment, game code and operation data necessary for the operation of the gaming device 100 may be store in a distributed manner such that some code is stored in memory device 204 and other code is stored remotely from gaming device 100. In one embodiment, the code and operation data necessary for the operation of the gaming device includes, for example, basic input and output function data, instruction fetching data, bus and network communication protocol data, and like data necessary for an operational gaming device 100. In one embodiment, the code and operation data necessary for the execution of the gaming features includes, for example, game image data, game rule data, pay table data, game mode and timing data, gaming value and wager parameter data, and random or pseudo-random number generation data.

In addition to the memory device 204 described above, in one embodiment, the code and operation data for the operation of the gaming device described above may be stored in removable game cartridges or flash drives, a compact disk ROM, a digital versatile disk (DVD) optical storage technology, or suitable other fixed non-transitory storage mediums. In another embodiment, part or all of the code and operational data for operation of the gaming device or for execution of the game features may be stored in a remote memory structure and be downloaded to the memory device 204 via a network connection. In one embodiment, the gaming device 100 may utilize any combination of memory devices such as random access memory devices (RAMs), unalterable memory devices (ROMs), and mass storage devices for securely storing and securely communicating the software components or code that facilitate game play and other functions of the gaming device 100. The memory devices may store software components or code that include various game data and game related control and execution software. In some embodiments, the software components stored in the memory devices may include gaming system initialization software, system basic input and output software, operating system software, value acceptor software, value dispenser software, display image generation software, game symbol set image generation software, game rule execution software, game data set(s), random number generation software, system driver software, system data bus management software, audio generation and speaker driver software, and video generation and display driver software, and any other suitable software routines for operation of the gaming device 100.

In some embodiments, the memory devices, such as memory device 204, with the software components and other data may be secured and authenticated by authentication software stored in an unalterable memory device within the housing of gaming device 100. The gaming device 100 may also include application specific integrated circuits (ASICs) to perform the security and authentication functions. At any appropriate time, such as before each play of a game, at a predetermined interval, upon transfer of any game data or any software components from a mass storage to memory device 204, or upon demand, the gaming device 100 (using a processor such as processor 202 or a separate ASIC) may execute an authentication routine and perform an authentication of any software component or other data of the gaming device 100. In one embodiment, the gaming device software components may be prepared for authentication via creation and storage of an encrypted signature unique to one or more of the software components.

In one embodiment, an encrypted signature may be created by utilizing a hash function on a software component or code to form a message digest (i.e., a hash of the software component) followed by a key encryption of the message digest to form an encrypted signature unique to the software component. In some embodiments, the key encryption may be public key encryption, private key encryption, or any suitable key encryption schema. The encrypted signature may be stored with the gaming device software component, for example, in a mass storage device or an unalterable memory. During a software component authentication, the gaming device 100 executes one or more authentication routines utilizing the same hash function to operate on the software component to compute, or re-create, a new message digest for the software component. The new or re-created message digest may then be compared with a previously created message digest obtained by decrypting the stored encrypted signature. Matching message digests between the new and previously created message digests indicate that the software component is authentic and gaming device 100 may allow game play to proceed. However, when the message digests do not match, the gaming device 100 may determine that the software component under authentication may be corrupted or fraudulent and game play may be halted. It should be appreciated that the gaming device 100 may perform other suitable security and authentication checks on the game data or software components. Such authentication and security devices and functions are unique to gaming and casino industry to minimize or prevent fraud in gaming devices and gaming systems.

For a player to interact with gaming device 100, control unit 200 receives and processes player inputs, and control unit 200 causes processed results to be output or communicated to the player. In one embodiment, player inputs are recognized and processed or directed for processing by input/output (I/O) controller 206. Further, I/O controller 206 may process and direct player outputs for communication to the player. I/O controller 206 can function as the intermediary between the specially configured processor 202 and one or more input devices to control information and data flow therebetween. I/O controller 206 may also function as the intermediary between the specially configured processor 202 and one or more output devices to control information and data flow therebetween. I/O controller 206 is configured to understand the communication and operational details (such as hardware addresses) for each attached input device and output device. In this manner, specially configured processor 202 is freed from the operational details of the peripheral I/O devices. For example, in one embodiment where an input or output device is changed or upgraded, I/O controller 206 can be changed without changing other gaming system 100 components.

In one embodiment, a player deposits value into gaming device 100 by inserting some form of currency into a value acceptor 208 for game play. Alternatively, a player deposits value into gaming device 100 by inserting an encoded paper ticket into a value acceptor 208 for game play in one embodiment. Value acceptor 208 can be combined with a currency reader and validator, and a code reader for reading value encoded on paper tickets. Value acceptor 208 may read, validate and communicate the amount of the inserted value to the specially configured processor 202. Specially configured processor 202 can establish a gaming credit balance for the player based on the communication from the value acceptor 208. Specially configured processor 202 can also communicate the player's credit balance on a credit balance display of gaming device 100. During game play, each time a player risks a wager on an outcome, specially configured processor 202 processes the wage and determines the amount of credits to debit from the player's credit balance. When a winning outcome is obtained, specially configured processor 202 is configured to determine the amount of credits to add to the player's credit balance.

As previously mentioned with respect to FIG. 1, a variety of value acceptance arrangements are possible. In one embodiment, the value acceptor 208 could include magnetic strip or chip card readers to accept and transfer value. Value acceptor 208 may also be configured to accept and transfer non-traditional currencies such as digital currencies. In these embodiments, I/O controller 206, a specially configured processor 202, or both contain appropriate control instructions to communicate and extract value from the inserted item containing value. In one embodiment, use of a magnetic strip or embedded chip card, for example a bank card, for value insertion requires specially configured processor 202 to communicate, via network interface controller 224 (described below), with devices external to the gaming device 100.

In one embodiment, card reader 210 may be included in gaming device 100 to accept player loyalty cards. For example, card reader 210 can extract account identifying information from the card and utilizes this information to access the associated account information stored remotely via network interface controller 224. In embodiments where player loyalty/player tracking systems are employed, a player's loyalty account and record of gaming activity can be stored in a networked storage location or database. Specially configured processor 202 is configured to record the player's gaming activity in memory device 204 during the duration of loyalty card insertion. When the loyalty card is removed from card reader 210, recorded gaming activity is uploaded, via network interface controller 224, to the remote storage location associated with the player's account. In this manner, the player's gaming activity can be further processed and analyzed, and the player can be awarded loyalty rewards based upon his activity data.

In various embodiments, player control 212 receives a player's game inputs and communicates the player's game inputs to specially configured processor 202. The player's game inputs may include, but are not limited to, wager amounts, pay line selections, game control signals, and cash-out signals. The player control 212 may generate signals based on button presses, touch screen activations, or voice control. The player initiated signals are propagated to the specially configured processor 202 by I/O controller 206. Further, the player initiated signals may direct and inform execution of the game instructions stored in memory device 204 and configured to be executed by specially configured processor 202.

In one embodiment, specially configured processor 202 is configured to execute stored program code and instructions which generate random numbers or pseudo-random numbers. In one embodiment, as illustrated in FIG. 2, a random number generator (RNG) 214 is a software module configured to be executed by specially configured processor 202 for the generation of a true random or pseudo-random number. The code for RNG 214 may be stored in memory device 204. RNG 214 generates random numbers for use by the gaming software during game execution. In one embodiment, random numbers are utilized by game software for the random selection of one or more game symbols from a set of game symbols during a game. As a non-limiting example, the set of game symbols can include numbers, letters, geometric figures, symbols, images, character, animations, blank symbols (e.g., the absence of symbols), or any other suitable graphical depiction. In various embodiments, once random symbols are selected based upon the random number generated by RNG 214, patterns of symbols are compared to determine wagering outcomes. In an alternative embodiment, gaming device 100 may include a hardware based random number generator that is in communication with specially configured processor 202 to supply random numbers for game generation purposes. The hardware based random number generator may be incorporated into specially configured processor 202 or can be separate from specially configured processor 202.

In yet another embodiment, random generation of "numbers" or symbols may be performed with electro-mechanical components. For example, gaming devices such as gaming device 100 may incorporate a plurality of mechanical reels rotatable about a common axis. A plurality of indicia or symbols may be positioned around the periphery of the plurality of reels. Each of the indicia or symbols on each reel may indicate separate detectable reel stop positions. The reels can be set into a spinning/rotation motion by pulling a lever or pushing a button. In some embodiments, the gaming device 100 can stop the reels by the gaming device 100 actuating, on a random timing basis, a suitable mechanical or electro-mechanical reel brake. When the reels stop rotating, one or more displayed stop positions of each reel is detected. Since the stop positions are each associated with an indicia or symbol, the gaming device can determine whether the combination of stop positions (i.e., translating to a combination of displayed symbols) results in a winning symbol combination.

Returning to FIG. 2, control unit 200 controls the function and output of a plurality of output devices utilized by gaming device 100. In various embodiments, I/O controller 206 serves as an interface unit between specially configured processor 202 and output devices such as video processor 216, cabinet lighting controller 218, audio controller 220, and value dispenser 222.

In one embodiment, video processor 216 communicates with specially configured processor 202 to render all game graphics, video displays, and information on gaming device 100's one or more video display units. In one embodiment, video processor 216 includes one or more processors, controllers, and/or graphics cards for processing the game images, outcomes, and animated displays and coordinating the processed data to be display between, among, or across any or all display devices. In various embodiments, this may include being configured to simulate objects and the movement of objects which represent video reels containing sets of gaming symbols.

It should be appreciated that in certain other embodiments where physical mechanical reels are utilized by the gaming device 100 as a game displays, reel controllers and stepper motors would be provided in lieu of or in addition to video processor 216.

In embodiments which utilize cabinet lighting as described with respect to FIG. 1, a cabinet lighting controller 218 may be utilized to coordinate and control the color and timing of cabinet lighting displays with specially configured processor 202. In certain embodiments which utilize sound design, specially configured processor 202 may utilize audio controller 220 to coordinate and control the sound emissions. In one embodiment, audio controller 220 may include one or more audio processing cards for generating sound and for driving the one, two or more speakers that may be included with gaming device 100.

In various embodiments, players may collect remaining credit value by initiating a signal via player control 212 which is communicated to specially configured processor 202 via I/O controller 206. The signal triggers a readout of the player's credit amount and specially configured processor 202 initiates a value dispensing signal which, in turn, is communicated to value dispenser 222. In one embodiment, value dispenser 222 can be controlled to issue the player's credit value using any of the types of value discussed herein. In some embodiments, the player's credit value may be issued to the player via a printed and dispensed encoded paper ticket or token which the player can then exchange at a special purpose kiosk or cashier location for the monetary value encoded into the ticket or token. In some embodiments, the specially configured processor 202 can direct the value dispenser 222 to issue to the player an appropriate amount of coin or bills directly to the player. Additionally, or alternatively, in some embodiments, the player may have the option to electronically direct the credit value to an account associated with the player.

In some embodiments, control unit 200 of gaming device 100 may communicate with one or more devices outside the gaming device 100. For example, gaming device 100 may be connected to a larger gaming network via a local area network (LAN) or a wide area network (WAN). Control unit 200 may communicate with one or more central servers, controllers, or remote devices to execute games, establish credit balances, participate in jackpots, etc. In such embodiments, network communications and connections are accomplished via a network interface controller 224. Network interface controller 224 can be a digital circuit board or card installed in control unit 200 to provide network communications with external devices.

In some embodiments, various additional features and functions are performed by control unit 200. For example, control unit 200 may be specially configured with appropriate software to track all game play events that occur on gaming device 100. In some embodiments, control unit 200 may audit all recorded monetary transactions, including all wager amounts, game outcomes, game winnings, and game payouts that occur through gaming device 100. Further, some embodiments may include security software to assist in protecting the gaming device 100 from tamper or alteration attempts.

Figure 3A:
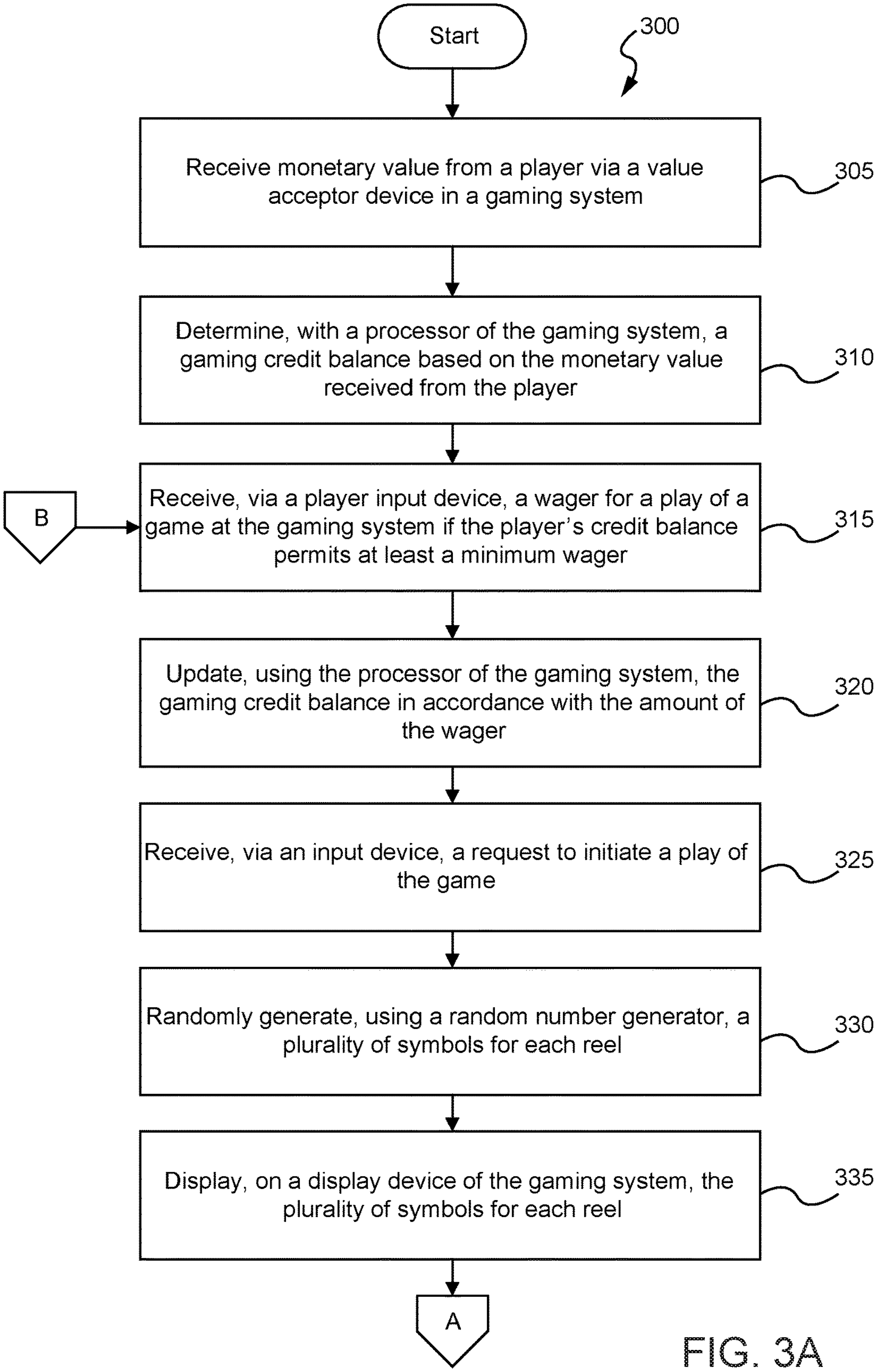
FIGS. 3A, 3B, and 3C illustrate one embodiment of a method of operating the gaming system.
Figure 3B:
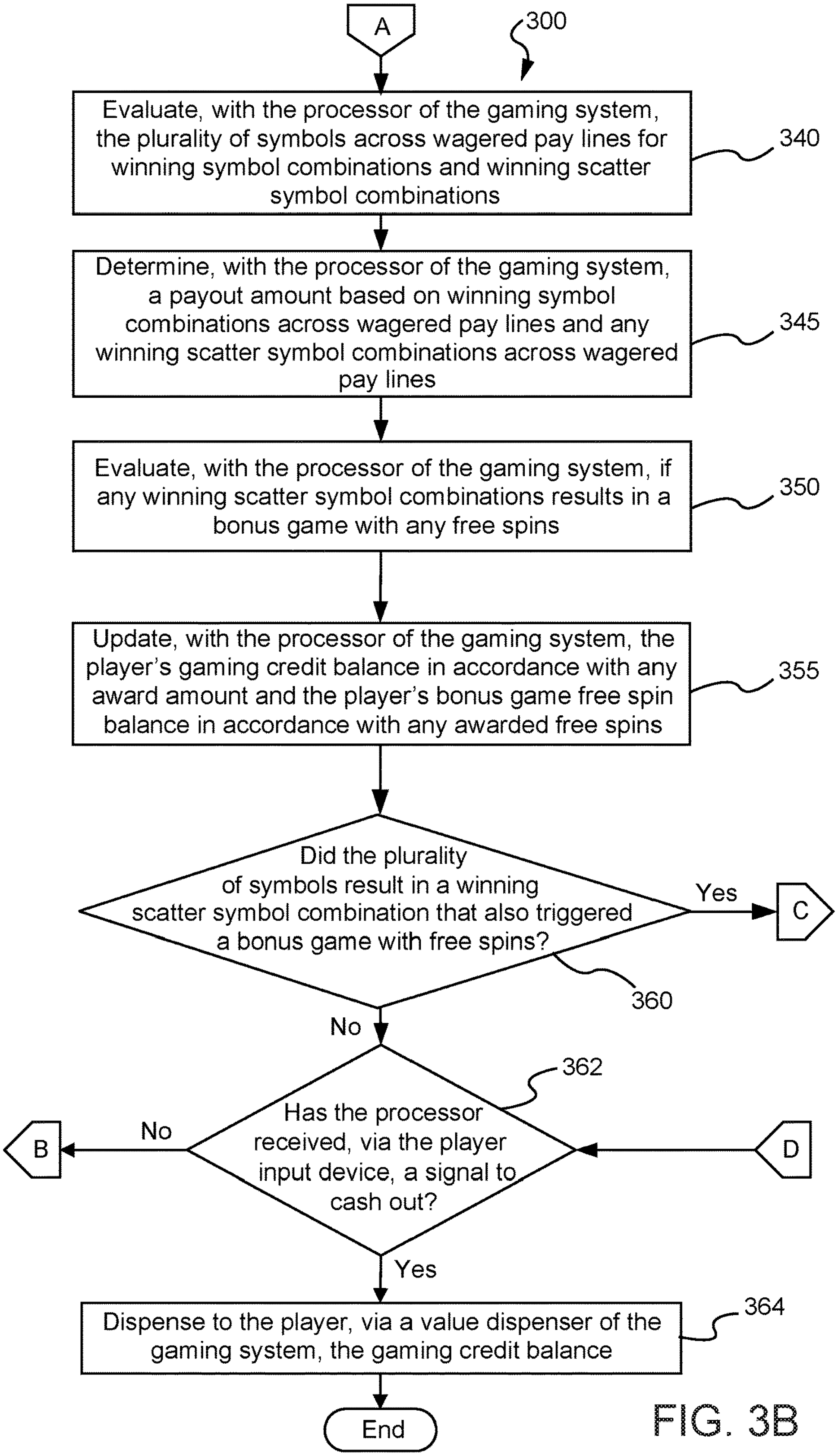

Game Including Designated Symbols that Trigger Game Functions and Provide Payout Awards FIGS. 3A and 3B illustrate a flowchart of an example operation 300 of one embodiment of the gaming system and method. In one embodiment, a processor is configured, via instructions stored in a memory device, to perform the operation 300. However, it should be appreciated that other suitable variations of operation 300 are possible. For example, in one embodiment, fewer or one or more additional blocks (not shown) may be employed in operation 300 of the gaming system and method. In other embodiments, the blocks may be performed in any suitable order.

FIG. 3A illustrates one embodiment in which the gaming system receives a monetary value from a player to initiate operation 300. As indicated in block 305, the gaming system may receive monetary value via a value acceptor device associated with the gaming system. The value acceptor device, in one embodiment, is disposed in a gaming system or in communication with the gaming system as discussed above.

In one embodiment, the gaming system determines a credit balance based on the monetary value received from the player at a value acceptor device as indicated in block 310. The gaming system determines, via a processor, a gaming credit balance for the player. The gaming credit balance may be based on the monetary value received from the player at the value acceptor device.

In one embodiment, the gaming system may receive a wager for a play of a game at the gaming system. Block 315 of FIG. 3A illustrates one embodiment where the player's wager is received via a player input device. The gaming system may allow a player to place a minimum wager, a maximum wager, or any suitable wager amount. Depending on the wager amount, the gaming system may also enable the player to select pay lines across displayed symbol positions on reels in a game in which to place wagers. In one embodiment, the gaming system may determine whether the player provided enough credits to enable the player's selected wager. The gaming system may prevent the player from placing the wager and starting a play of a game if the player's credit balance is not large enough to support the player's selected wager. If enough credits are not available in the player's credit balance, the gaming system enables the player to insert additional value to obtain the minimum credit level or to cash out of the gaming system.

In one embodiment, the gaming system may use a processor of the gaming system to update a gaming credit balance. The credit balance may be updated in accordance with the player's wager amount as indicated in block 320. Some embodiments, the credit balance is not updated until a later time.

Block 325 illustrates one embodiment in which the gaming system may receive a request to initiate a play of a game. The request to initiate the play of the game may be received from a player via a player input device in communication with the gaming system. The gaming system may securely access game data from a memory device and execute an authentication routine on the game data to start a play of a game. For example, the player may press a spin button on the gaming system to start the spinning reels (or randomly generating symbols using other methods discussed above) for the play of the game.

In one embodiment, the gaming system may use a random number generator to randomly generate a plurality of symbols from a set of symbols as indicated in block 330. In one embodiment, at least some of the symbols in the set of symbols are classified or associated with a symbol type. In some embodiments, the gaming system may generate the plurality of symbols for display on a set of reels. As used herein, the random number generation may refer to pseudo-random or true-random number generation depending on the module used for the random number generation.

In one embodiment, the gaming system may cause a display device to display the plurality of symbols generated as indicated in block 335. In a game using reels, the gaming system may display the generated plurality of symbols in visible symbol display areas of each of the reels. Off page connector A refers to FIG. 3B to continue operation 300.

Turning now to FIG. 3B and off page connector A, in one embodiment as shown in block 340, the gaming system evaluates the generated plurality of symbols across wagered pay lines for winning symbol combinations. In some embodiments, the gaming system evaluates the winning symbol combinations based on the pay lines wagered upon by a player. The gaming system may evaluate the player selected pay lines or default pay lines assigned for the play of the game. In one embodiment using reels, the gaming system determines an award amount based on winning symbol combinations formed across the reels on active (wagered upon) pay lines. For example, if a pay table associated with the gaming system indicated that at least three of the same bar symbols is a winning symbol combination and awards a predetermined payout, the gaming system would evaluate the generated plurality of symbols for bar symbols. If at least three bar symbols were generated on adjacent reels and along a pay line, the gaming system may determine that the three bar symbols is a winning symbol combination based on the predetermined pay table. It should be appreciated that a pay table may include any suitable number of winning symbol combinations and payouts. In one embodiment, a pay table may indicate that as few as one symbol may be associated with a payout. Alternatively, two or more symbols may be used to form winning symbol combinations that result in a payout.

In block 340, the gaming system also evaluates the plurality of symbols for winning scatter symbol combinations that result in payouts. In one embodiment, a pay table associated with the gaming system may include a payout for at least three of the same scatter symbols that are generated for adjacent reels and along a pay line. In another embodiment, the pay table associated with the gaming system may include a payout for at least three of any scatter symbols that are generated for adjacent reels and along a pay line. That is, where the gaming system includes more than one different type of scatter symbol, the different or mixed scatter symbols can be generated along a pay line and still result in a winning scatter symbol combination. It should be appreciated that the pay table may include any suitable number of winning scatter symbol combinations and payouts for scatter symbols. In one embodiment, the pay table may indicate that as few as one scatter symbol may be associated with a payout. In some embodiments, one scatter symbol resulting in a payout may be reserved for a bonus game. Alternatively, two or more scatter symbols may be used to form winning scatter symbol combinations that result in a payout.

Returning to block 345, the gaming system determines, with the processor, a payout amount based on the evaluated winning symbol combinations and winning scatter symbol combinations across wagered pay lines.

As illustrated in block 350, the gaming system also evaluates, with the processor, whether any winning scatter symbol combinations result in a game triggering event. In one embodiment, a winning scatter symbol combination may include a bonus game. In another embodiment, a winning scatter symbol combination may include a bonus game with free spins. As noted above, scatter symbols are symbols that are not required to be generated on one pay line with other scatter symbols to be combined to form a winning scatter symbol combination. That is, a plurality of scatter symbols can be generated for any visible symbol position on the reels and still form a winning scatter symbol combination. In other words, the gaming system may evaluate scatter symbols independent of the wagered pay lines for winning outcomes in addition to the winning outcomes discussed in connection with block 340. In one embodiment, a winning scatter symbol combination triggers a game feature such as a bonus game. In one such embodiment, the bonus game may include a predetermined or randomly generated quantity of free spins for the bonus game. In one embodiment, a winning scatter symbol combination may trigger a payout multiplier, such as a 3× multiplier. However, it should be appreciated that any suitable multiplier or no multiplier may be used. It should also be appreciated that scatter symbols may be associated with any suitable combination of features in a game.

At block 355, the gaming system may update, with the processor, the player's gaming credit balance in accordance with any award amount. If the player won free spins, the gaming system may also update the player's bonus game free spin balance in accordance with the quantity of free spin wins. As noted above, the blocks illustrated in FIGS. 3A-3C can be rearranged in any suitable order. As such, it should be appreciated that the gaming system may update player's gaming credit balance and bonus game free spin balance at other suitable times.

In one embodiment, as indicated in block 360, if the gaming system did not determine that generated plurality of symbols resulted in a winning scatter symbol combination that triggered a bonus game (or a bonus game with free spins), operation 300 moves to block 362.

In one embodiment, as indicated in block 362, the gaming system may receive a signal to end game play or "cash out" via an input device of the gaming system. In such a situation, the gaming system dispenses a value to the player, through a value dispenser, based on the player's gaming credit balance as illustrated in block 364 and operation 300 ends.

On the other hand, if the gaming system processor has not received a signal to end game play via the player input device, the process of operation 300 returns to block 315 via off page connector B. The gaming system may receive, via a player input device, a wager for another play of the game and continue operation 300 from block 315. However, in one embodiment, the wager may not be accepted if the player has fewer credits than the player's selected wager amount as shown in block 315.

Figure 3C:
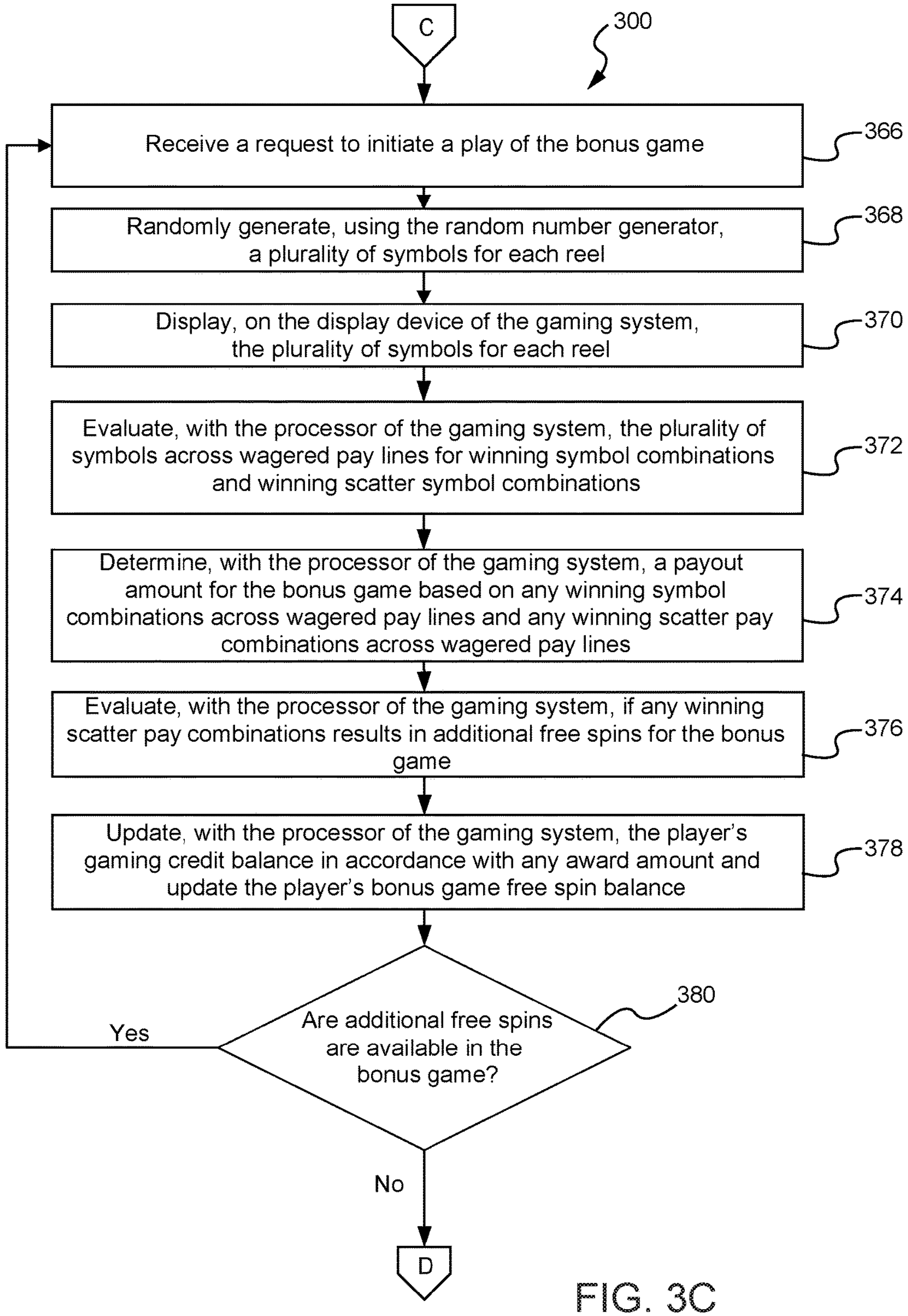

Returning now to block 360, if the gaming system determined that the generated plurality of symbols resulted in a winning scatter symbol combination that triggers a bonus game (or a bonus game with free spins), operation 300 moves to block 366 in FIG. 3C via off page connect C.

Block 366 illustrates one embodiment in which the gaming system may receive a request to initiate a play of the bonus game. The request to initiate the play of the bonus game may be received from a player via a player input device in communication with the gaming system. For example, the player may press a spin button on the gaming system to start spinning reels (or randomly generating symbols) for the play of the bonus game. In an alternative embodiment, the processor of the gaming system may automatically initiate the play of the bonus game.

In one embodiment, the gaming system may use a random number generator to randomly generate a plurality of symbols from a set of symbols for the bonus game as indicated in block 368.

The gaming system may cause the display device to display the plurality of symbols generated as indicated in block 370. The gaming system may display the generated plurality of symbols in visible symbol display areas of each of the reels of the gaming system.

In one embodiment as shown in block 372, the gaming system evaluates the generated plurality of symbols across wagered pay lines for winning symbol combinations. In some embodiments, gaming system evaluates the winning symbol combinations based on the pay lines wagered upon by a player. The gaming system may evaluate the player selected pay lines or default pay lines. In one embodiment of the bonus game incorporating reels (or virtual reels), the gaming system determines an award amount based on winning symbol combinations formed across the reels on active (wagered upon) pay lines. However, it should be appreciated that in some embodiments, the active pay lines are predetermined or the gaming system selects default pay lines for the evaluation. For example, if a pay table associated with the gaming system indicated that at least three of the same cherry symbols is a winning symbol combination and provides a predetermined payout, the gaming system would evaluate the generated plurality of symbols for cherry symbols. If at least three cherry symbols were generated on adjacent reels and along a pay line, the gaming system may determine that three cherry symbols form a winning symbol combination based on the predetermined pay table. It should be appreciated that a pay table may include any suitable number of winning symbol combinations and payouts. In one embodiment, a pay table may indicate that as few as one symbol may be associated with a payout. Alternatively, two or more symbols may be used to form winning symbol combinations that result in a payout.

Continuing with block 372, the gaming system also evaluates the generated plurality of symbols in the bonus game for winning scatter symbol combinations that result in payouts. In one embodiment, a pay table associated with the gaming system may include a payout for at least three of the same scatter symbols that are generated for adjacent reels and along a pay line. In another embodiment, the pay table associated with the gaming system may include a payout for at least three of any scatter symbols that are generated for adjacent reels and along a pay line. That is, where the gaming system includes more than one different type of scatter symbol, the different or mixed scatter symbols can be generated along a pay line and still result in a winning scatter symbol combination. It should be appreciated that the pay table may include any suitable number of winning scatter symbol combinations and payouts for scatter symbols. In one embodiment, the pay table may indicate that as few as one scatter symbol may be associated with a payout. Alternatively, two or more scatter symbols may be used to form winning scatter symbol combinations that result in a payout.

In block 374, the gaming system determines, with the processor, a payout amount for the play of the bonus game based on the evaluated winning symbol combinations and winning scatter symbol combinations across wagered pay lines.

As illustrated in block 374, the gaming system also evaluates, with the processor, whether any winning scatter symbol combinations results in additional free spins. It should be appreciated that in some embodiments, winning scatter symbol combinations may not result in free spins, but could be any other suitable award. As noted above, scatter symbols are symbols that are not required to be generated on one pay line with other scatter symbols to be combined to form a winning scatter symbol combination. That is, a plurality of scatter symbols can be generated for any visible symbol position on the reels and still form a winning scatter symbol combination. In other words, the gaming system may evaluate scatter symbols independent of the wagered pay lines for winning outcomes in addition to the winning outcomes discussed in connection with block 372.

At block 378, the gaming system may update, with the processor, the player's gaming credit balance in accordance with any obtained award amount from the play of the bonus game. If the player won free spins, the gaming system may also update the player's bonus game free spin balance in accordance with the quantity of free spin wins (not shown). As noted above, the blocks illustrated in FIGS. 3A-3C can be rearranged in any suitable order. As such, it should be appreciated gaming system may update player's gaming credit balance and bonus game free spin balance at other suitable times.

At block 380, the gaming system determines if the player's bonus game free spin balance includes remaining free spins. If free spins remain, then the operation 300 may return to block 366 to continue with another play of the bonus game. It should be appreciated that player may cash out at any time, even if free spin balance remains. In some embodiments, the player loses the free spins for cashing out early (e.g., before all free spins are used in the bonus game). In other embodiments, the player retains the free spins in the player's bonus game free spin balance for use in future bonus games.

If no free spins remain, then the operation 300 may proceed via off page connector D and return to block 362 in FIG. 3B. As indicated in block 362, the gaming system may receive a signal to end game play or "cash out" via an input device of the gaming system. In such a situation, as illustrated in block 364, the gaming system dispenses a value to the player through a value dispenser based on the player's gaming credit balance and operation 300 ends.

On the other hand, if the gaming system processor has not received a signal to end game play via the player input device, the process of operation 300 returns to block 315 via off page connector B. The gaming system may receive, via a player input device, a wager for another play of the game and continue operation 300 from block 315. However, in one embodiment, the wager may not be accepted if the player has fewer credits than the player's selected wager amount as shown in block 315.

FIGS. 4A-4H, illustrate screen shots of one embodiment of a gaming system having designated symbols that can provide game triggering events and line payouts (including same symbol and mixed symbol line payouts).

Figure 4A:
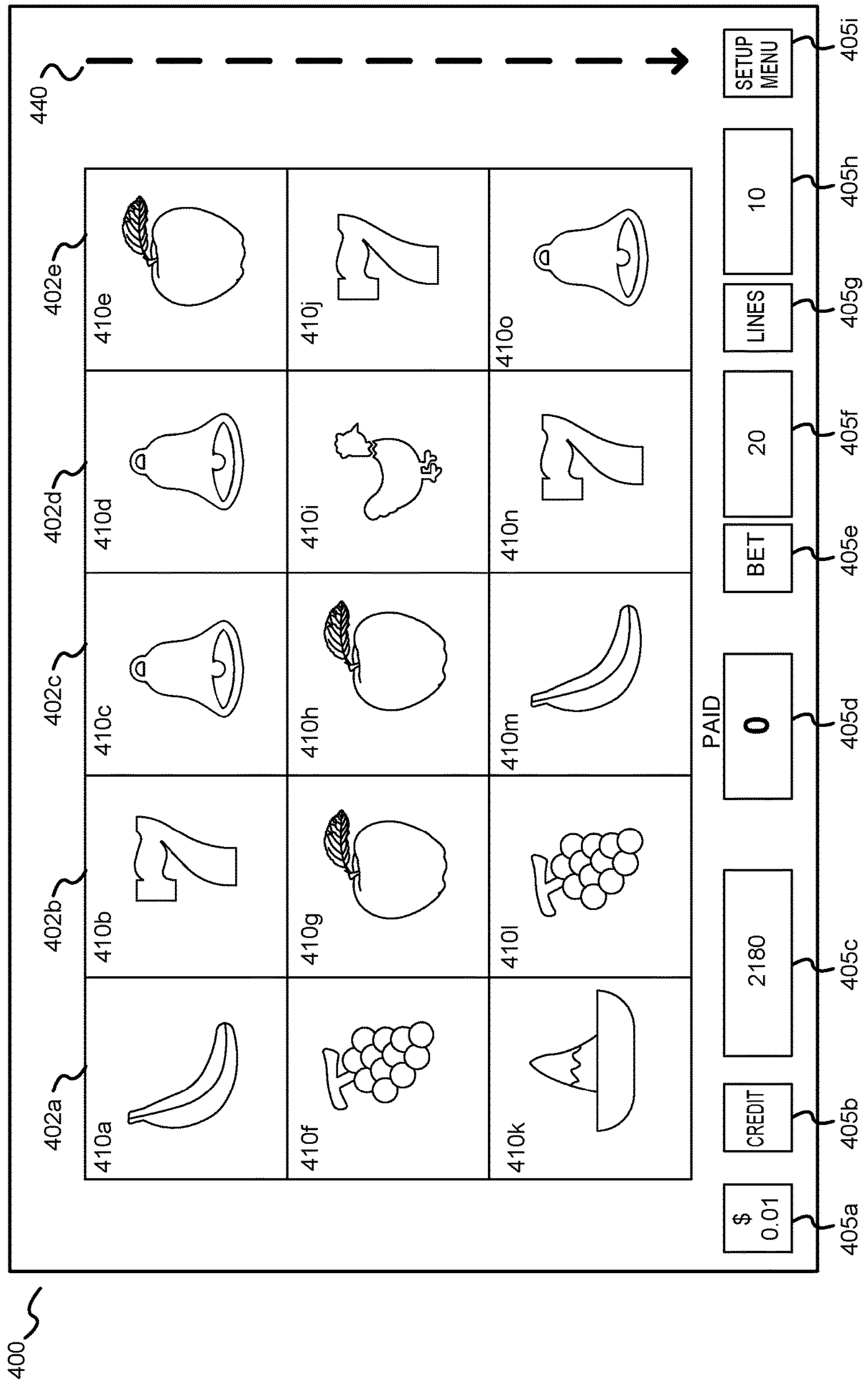
FIGS. 4A, 4B, 4C, 4D, 4E, 4F, 4G, 4H illustrate screen shots of one embodiment of a gaming system comprising scatter symbols that can provide game triggering events and line payouts.

FIG. 4A illustrates one embodiment of a game display 400 that the gaming device 100 may display on a display device. In one embodiment, game display 400 may be displayed on first display 122 of gaming device 100 illustrated in FIG. 1. However, any other suitable display may be used. The game display 400 displays a set of a plurality of reels 402*a*, 402*b*, 402*c*, 402*d*, and 402*e* as illustrated in FIG. 4A. As also illustrated in FIG. 4A, the reels 402*a*-402*e* are displayed substantially side by side. It should be appreciated that reels 402*a*-402*e* can be displayed with any suitable amount of separation or no separation. It should be appreciated that the game shown in game display 400 is merely representative and may have more or fewer game elements shown in the game display 400.

The plurality of reels 402*a*-402*e* are each associated with a set of symbols, where the set of symbols includes a plurality of symbols. Each reel 402*a*-402*e* is associated with a plurality of symbols of the set of symbols. Each reel 402*a*-402*e* can also be associated with the same or a different plurality of symbol combinations from the first set of symbols. The set of symbols may include numbers, letters, geometric figures, symbols, images, character, blank symbols (e.g., the absence of symbols), animations, or any other suitable graphical depiction. The symbols in the set of symbols may include pay symbols and special or designated symbols. In one embodiment, the special or designated symbols are scatter symbols. In some embodiments, the scatter symbols trigger game events and also provide line payouts (including same symbol and mixed symbol line payouts).

Returning now to FIG. 4A, the game display 400 depicts a plurality of symbol display areas 410*a*, 410*b*, 410*c*, 410*d*, 410*e*, 410*f*, 410*g*, 410*h*, 410*i*, 410*j*, 410*k*, 410*l*, 410*m*, 410*n*, and 410*o*. This plurality of symbol display areas can be associated in a manner that provides the appearance of game reels. It should also be appreciated that the symbol display areas may not be associated with game reels in some embodiments. As illustrated in FIG. 4A, symbol display areas 410*a*, 410*b*, 410*c*, 410*d*, 410*e*, 410*f*, 410*g*, 410*h*, 410*i*, 410*j*, 410*k*, 410*l*, 410*m*, 410*n*, 410*o* are associated in a manner that provides the appearance of a set of five game reels. In one embodiment, the plurality of symbol display areas that provide the appearance of five game reels may be arranged in a manner that visibly shows three symbol positions of each of the five game reels. For example, the symbol display areas 410*a*-401*o* are each associated with positions on reels 402*a*-402*e*, respectively. As shown in FIG. 4A, symbol display areas 410*a*, 410*f*, and 410*k* are associated with reel 402*a*; symbol display areas 410*b*, 410*g*, and 410*l* are associated with reel 402*b*; symbol display areas 410*c*, 410*h*, and 410*m* are associated with reel 402*c*; and symbol display areas 410*d*, 410*i*, and 410*n* are associated with reel 402*d*; and symbol display areas 410*e*, 410*j*, and 420*o* are associated with reel 402*e*. The arrangement illustrated in the embodiment of FIG. 4A thus creates a visible display area of the reels 402*a*-402*e* comprising three visible symbol positions for each reel. When viewed together, reels 402*a*-402*e* appear like a 3-row by 5-column reel array in display 400. In other embodiments, smaller or larger visible areas of the reels can be displayed. That is, the reels 402*a*-402*e* may show fewer or a larger number of visible symbol display areas. While symbol display areas are illustrated with defined boxes, it should be appreciated that in some embodiments, the defined boxes are not visible to the player.

Each reel 402*a*-402*e* may display a plurality of symbols that the gaming system generates from the set of symbols in their respective symbol display areas as illustrated in FIG. 4A. Spin direction 440 illustrates the direction that the reels may be shown spinning in one embodiment. However, it should be appreciated that the reels may be shown spinning in any suitable direction. The reels may also be shown spinning in different directions in some embodiments.

Game display 400 also includes several information areas and buttons 405*a*-405*i*. These information areas and buttons 405*a*-405*i* are illustrated in a particular arrangement, but may be arranged in any suitable manner in different embodiments. In some embodiments, game display 400 may include more or fewer display areas and buttons 405*a*-405*i* than illustrated in FIG. 4A-4H. Information area 405*a* illustrates an example value of one credit for the game displayed in game display 400. Information areas 405*b* and 405*c* illustrate an example of the amount of the player's available credits. Information area 405*d* illustrates the amount of credits a player has won. Because FIG. 4A illustrates the start of a play of a game, the information area 405*d* shows zero credits have been won. Button 405*e* illustrates a software button that the player can select to place a bet or wager. It should be appreciated that the functionality of button 405*e* may also be replicated or replaced with a hardware button on the gaming device 100. Information area 405*f* illustrates that the player has selected to wager 20 credits. Button 405*g* illustrates a software button that the player can select to determine how many pay lines to wager on. It should be appreciated that the functionality of button 405*g* may also be replicated or replaced with a hardware button on the gaming device 100. Information area 405*h* illustrates that the player selected to wager on 10 pay lines. Button 405*i* illustrates a software button that the player can select to obtain information about the game, change certain aspects of the game, obtain help, place an order, etc.

To start a gaming session, a player provides the gaming system with a deposit of value, using one of the suitable mechanisms discussed above. The gaming system receives and validates the player's deposit of value. The gaming system can then issue credits (or gaming credits) to the player based on the received value. The credits enable the player to initiate a play of a game and to also place wagers on a play of the game. The gaming system may provide a visual indication of the player's credit balance to the player as discussed above in information area 405*c*.

To initiate a play of a game, the player activates or presses one or more appropriate buttons on the gaming system to deduct credits necessary to play the game and to identify the player's wager. Along with receiving the player's wager, the gaming system may receive pay line selections or other game functions the player wishes to activate in exchange for the wager. The player may also actuate a game start button or a spin button. The gaming system may deduct the appropriate credits from the player's credit balance after the wager or at any suitable time.

Figure 4B:
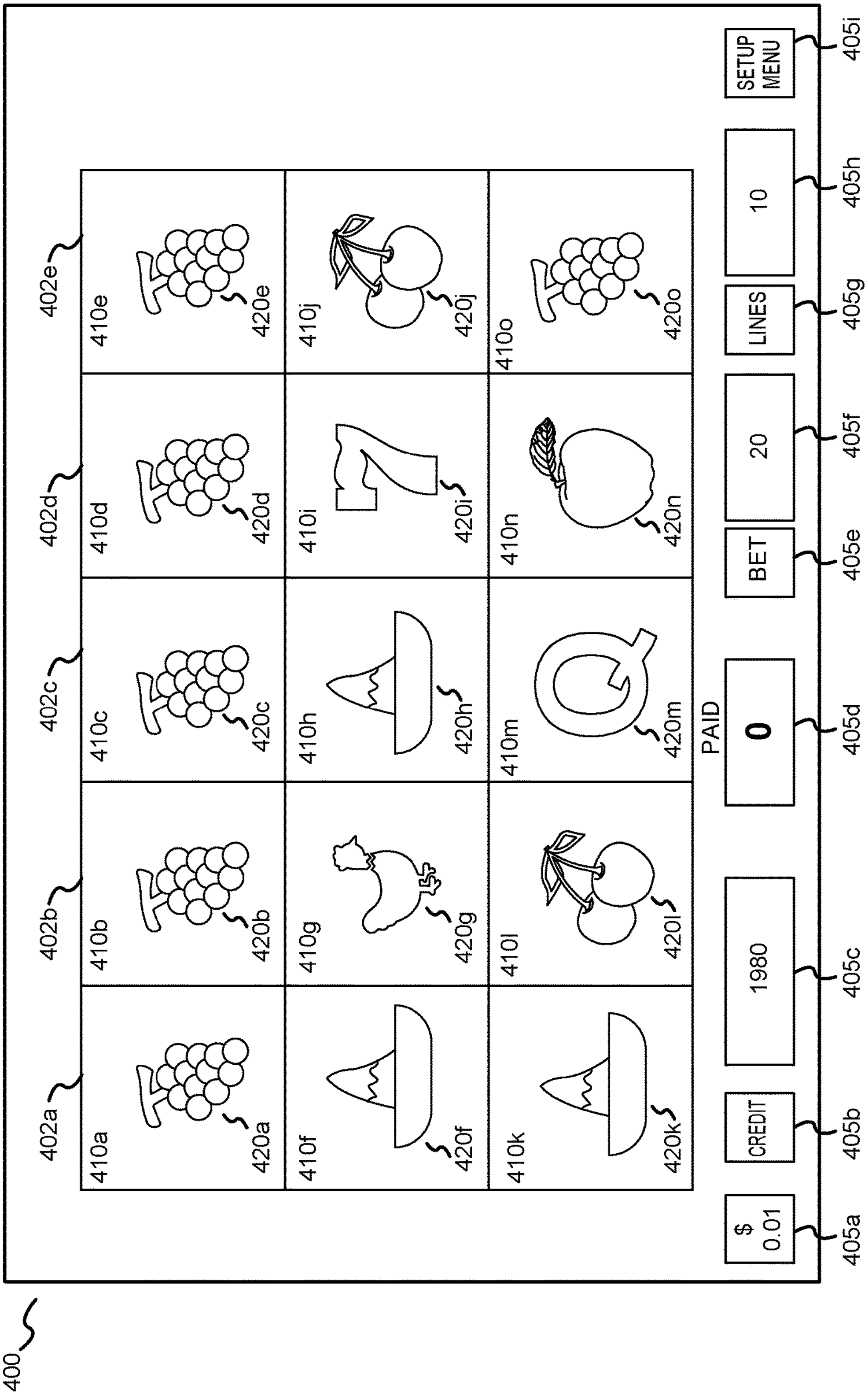

Upon receipt of the player's wager and activation of the game start button, the gaming system may show a display of spinning reels for each of the reels 402*a*-402*e*. The spinning may appear to occur in a vertical top to bottom direction as illustrated with spin direction 440 in FIG. 4A or in a vertical bottom to top direction (not shown), or in a combination of vertical directions (not shown). In one embodiment, the gaming system randomly generates symbols 420*a*-420*o* from the first set of symbols for reels 402*a*-402*e*, respectively. As noted above, the gaming system may rely on random generation performed by a pseudo RNG, a true RNG, or hardware RNG. In embodiment, the gaming system may also update the player's credit meter (information area 405*c*) to reflect the player available credit balance. As shown in FIG. 4B, the player's credit meter (information area 405*c*) was decremented by 200 credits from 2180 to 1980 to reflect the 200 credit wager the player placed for the play of the game.

The gaming system displays the generated symbols 420*a*-420*o* in symbol display areas 410*a*-401*o* as illustrated in FIG. 4B. Symbols 420*a*-420*o* displayed on reels 402*a*-402*e* illustrate the randomly generated symbols after the reels have stopped spinning. As illustrated in FIG. 4B, the gaming system randomly generated and displayed symbols 420*a*, 420*f*, and 420*k* in symbol display areas 410*a*, 410*f*, and 410*k* for reel 402*a*. The gaming system also randomly generated and displayed symbols 420*b*, 420*g*, and 420*l* in symbol display areas 410*b*, 410*g*, and 410*l* for reel 402*b*; symbols 420*c*, 420*h*, and 420*m* in symbol display areas 410*c*, 410*h*, and 410*m* for reel 402*c*; symbols 420*d*, 420*i*, and 420*n* in symbol display area 410*d*, 410*i*, and 410*n* for reel 402*d*; symbols 420*e*, 420*j*, and 420*o* in symbol display area 410*e*, 410*j*, and 410*o* for reel 402*e*.

As illustrated in FIG. 4B, the gaming system generated and displayed Grape symbols (420*a*, 420*b*, 420*c*, 420*d*, 420*e*, 420*o*), Hat symbols (420*f*, 420*h*, 420*k*), Chicken symbol (420*g*), Seven symbol (420*i*), Cherry symbols (420*j*, 420*l*), Queen symbol (420*m*), and an Apple symbol (420*n*) in the game display 400. It should be appreciated that the displayed symbol combinations are merely for explanatory purposes and the gaming system may randomly generate any suitable combination of symbols based on defined symbol sets. In one embodiment, as illustrated in the pay table of FIG. 5, the Hat symbols and the Chicken symbol were designated as scatter symbols. It should be appreciated that any suitable symbol can be designated as a scatter symbol.

Figure 4C:
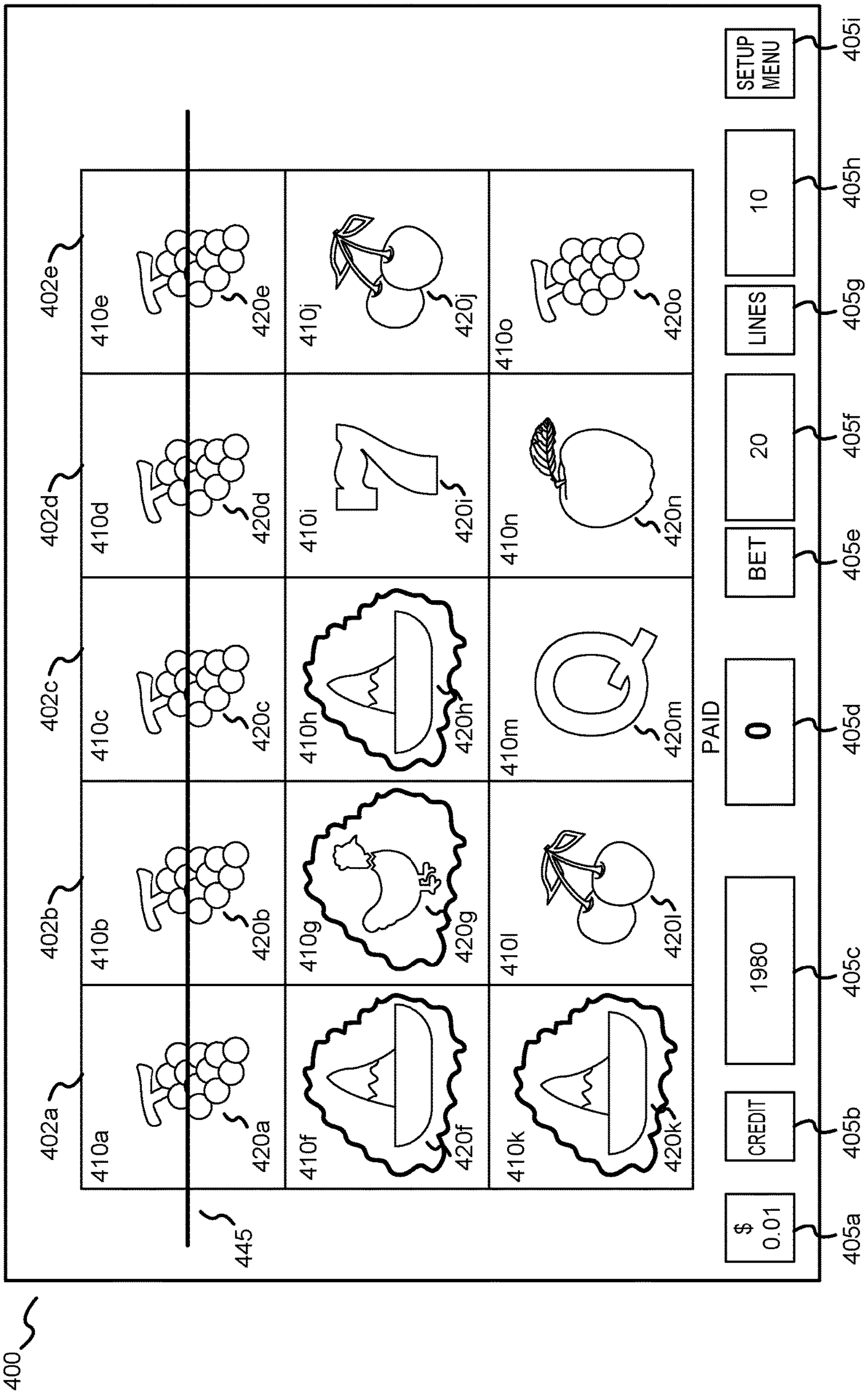
Figure 4D:
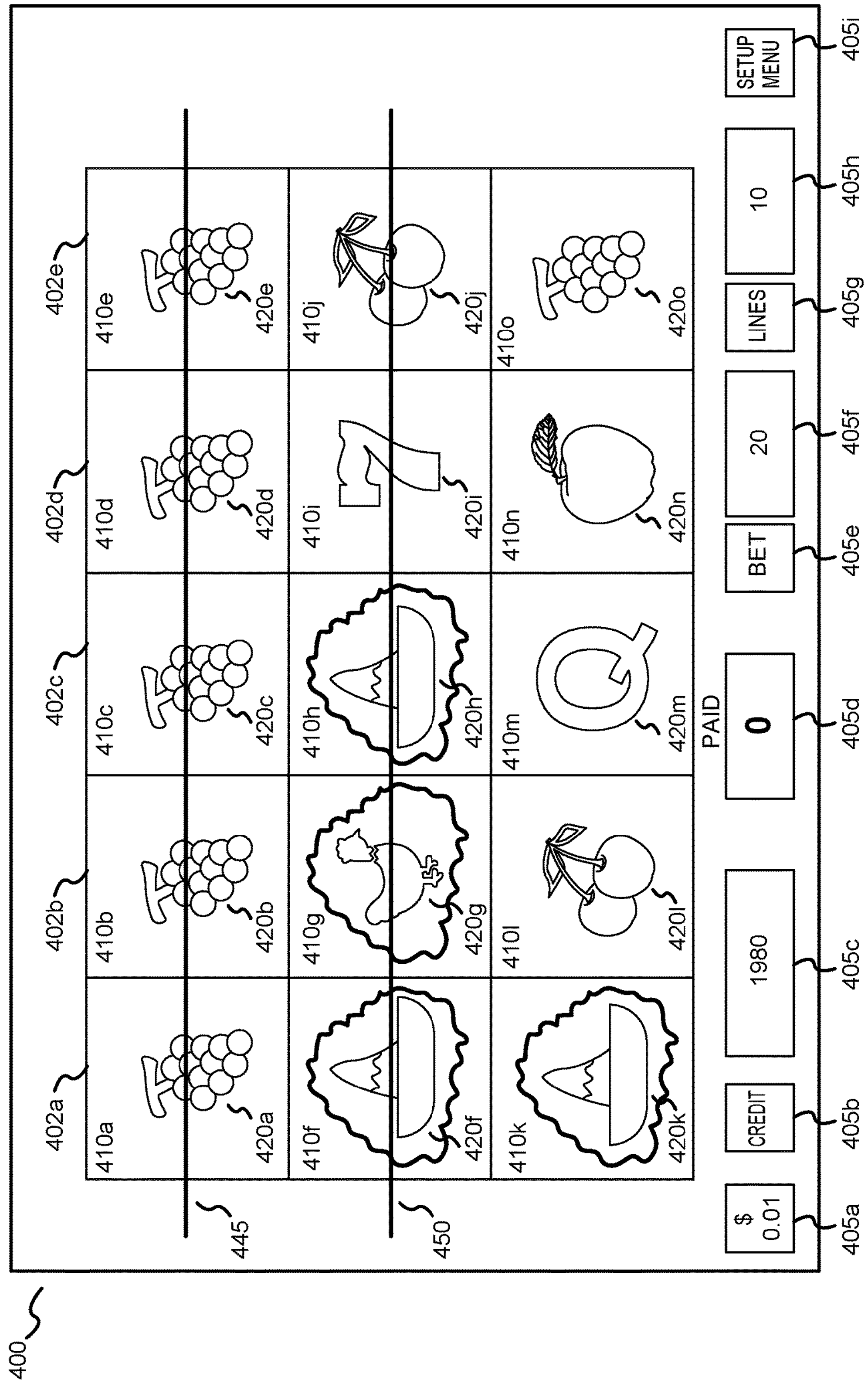
Figure 4E:
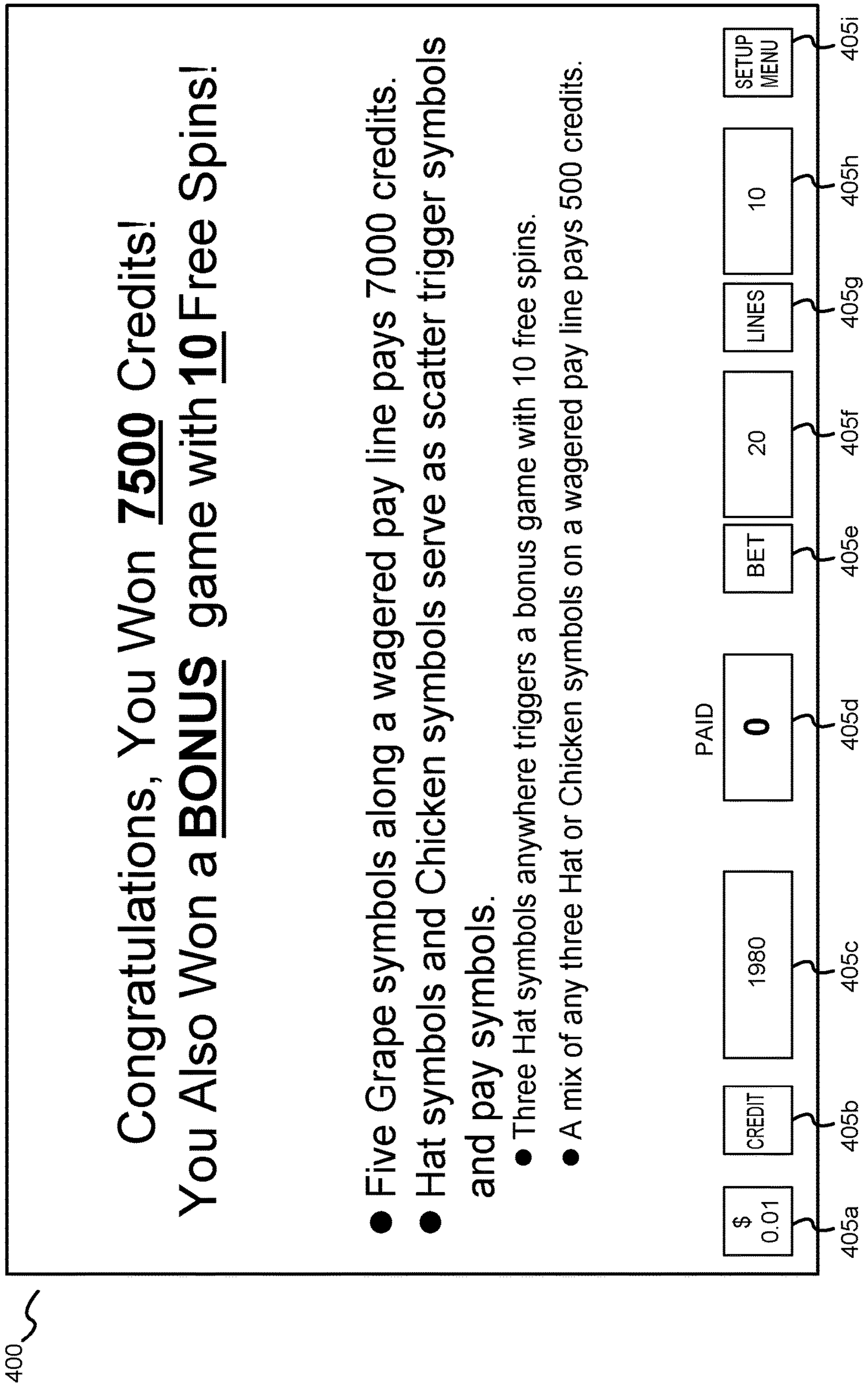
Figure 4F:
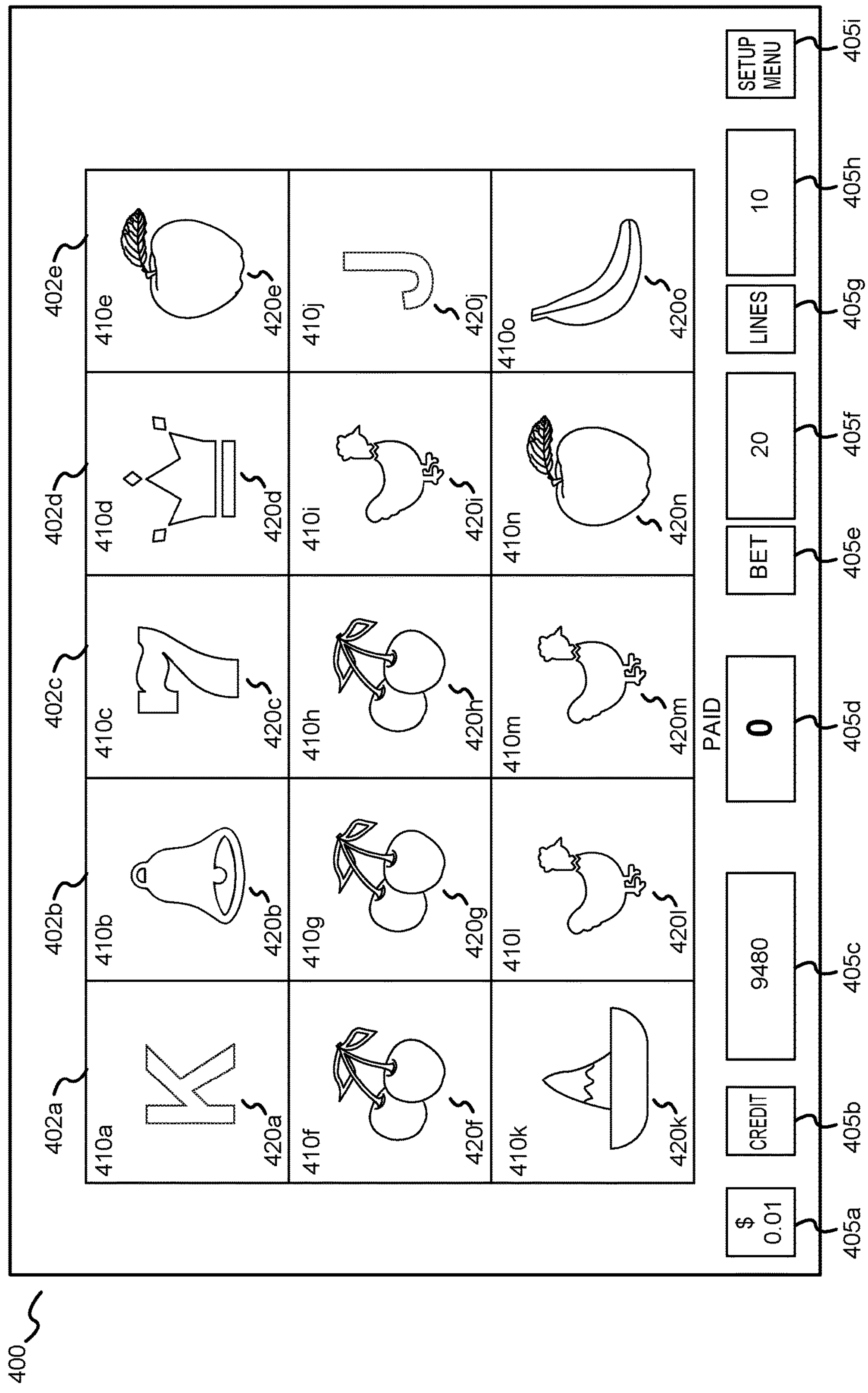
Figure 4G:
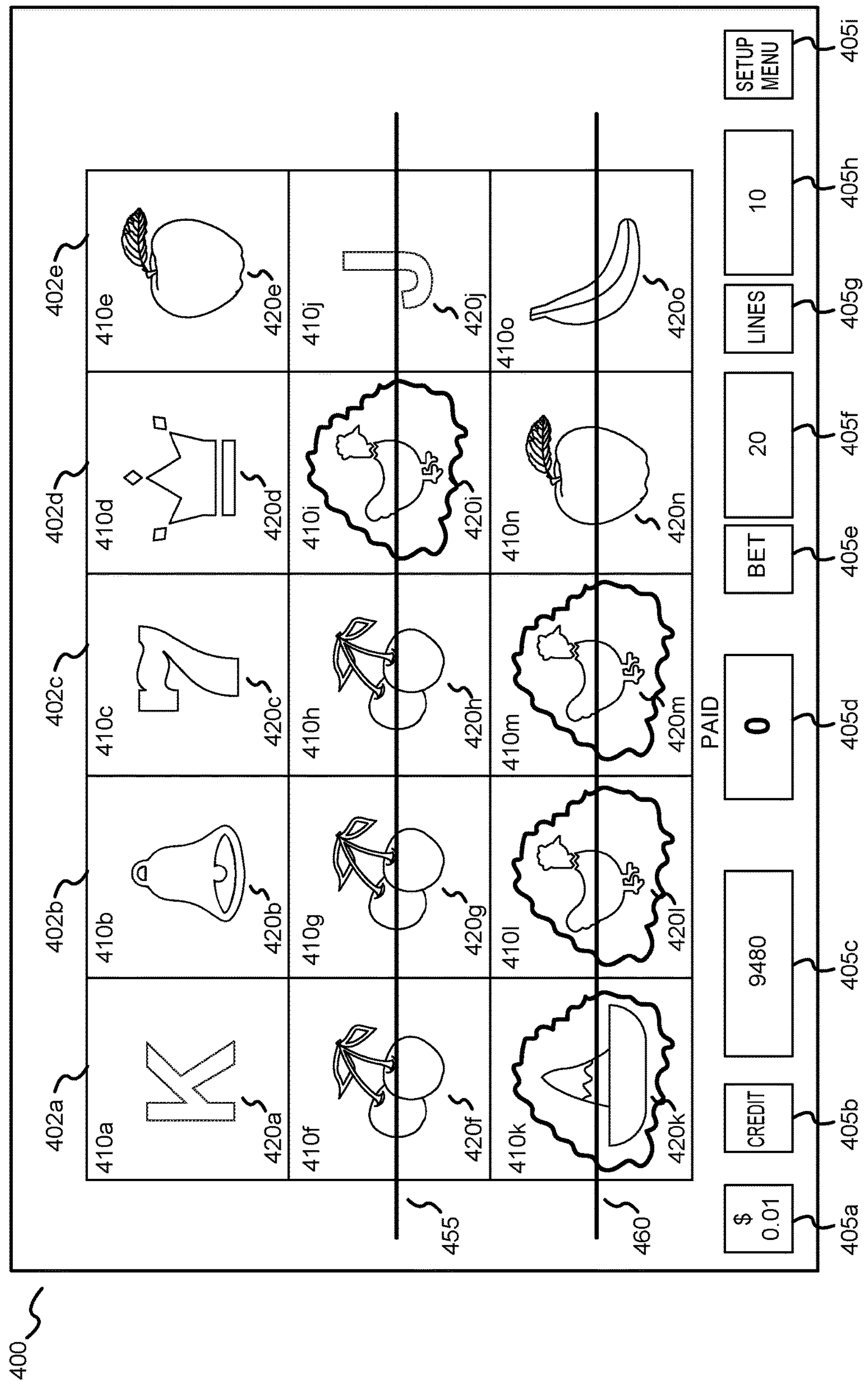
Figure 4H:
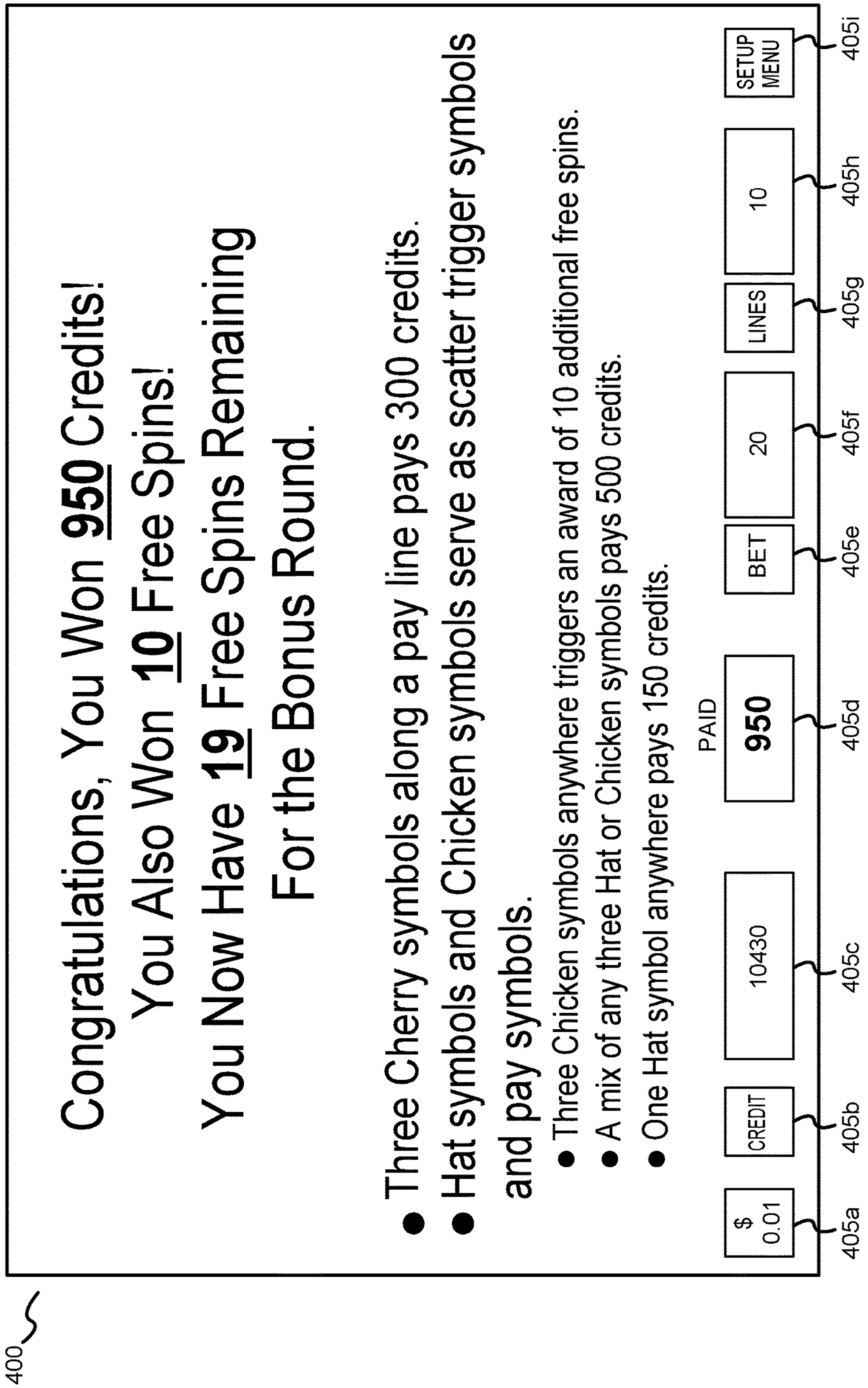
Figure 5:
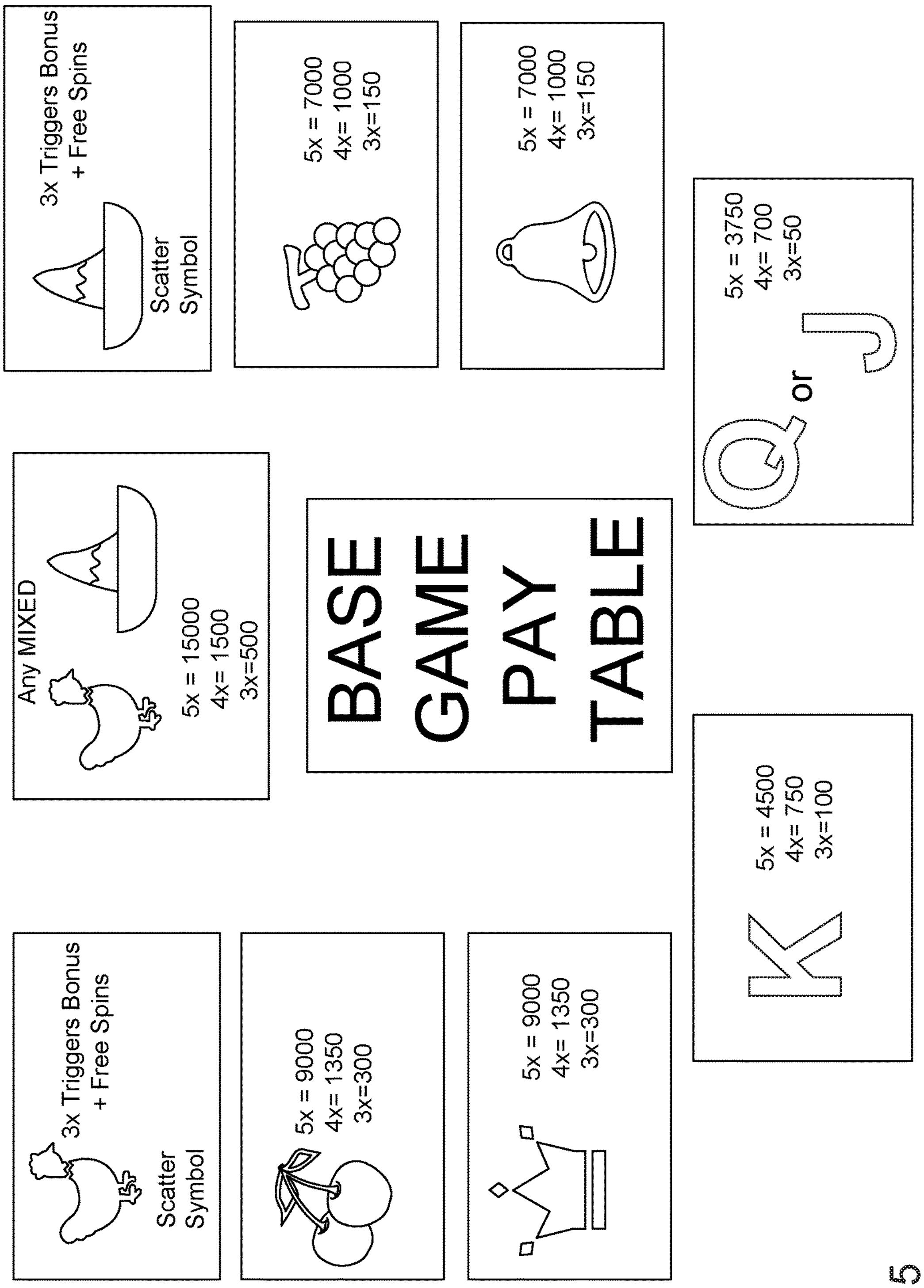
FIG. 5 illustrates one embodiment of a pay table for a base game.

For the game illustrated in FIGS. 4A-4H and as shown in FIG. 5, the scatter symbols trigger the gaming system to provide a bonus game when at least three of the same scatter symbols are generated in any three of the symbol display areas 410*a*-410*o*. It should be appreciated that any suitable number of scatter symbols may be used to form a winning symbol combination to trigger a bonus game. In some embodiments, scatter symbols may also provide other scatter awards, such as multiplier awards.

As shown illustrated in FIG. 5, the gaming system also awards line payouts (or line pays) when at least three of any scatter symbols are generated in any three adjacent symbol display areas 410*a*-410*o* along a wagered pay line. For example, the gaming system will award a line payout (or line pays) when at least three Hat symbols are generated in three adjacent symbol display areas 410*a*-410*o* along a wagered pay line. In some embodiments, the gaming system will also award a line payout (or line pays) when a mix of any three or more Hat symbols or Chicken symbols are generated in adjacent symbol display areas 410*a*-410*o* along a wagered pay line (e.g., one Hat symbol and two Chicken symbols; two Hat symbols and one Chicken symbol; three Hat symbols and one Chicken symbol, etc.). In one embodiment, the scatter symbols can appear in any order along a pay line to form a winning symbol combination. In some embodiments, the pay table can be structured to require that the gaming system generate the scatter symbols in a certain order to form a winning symbol combination.

FIG. 4C illustrates one embodiment of a gaming system executing an evaluation of the generated symbols on reels 402*a*-402*e* for winning symbol combinations. As noted above, the player may have wagered on one or more pay lines (such as 10 pay lines shown in information area 405*h*). In one embodiment, at least the wagered on pay lines are evaluated for winning symbol combinations. Any suitable number of pay lines may be used to evaluate winning symbol combinations.

In the embodiment illustrated in FIG. 4C, the gaming system evaluated the displayed symbol combinations for winning symbol combinations. In FIG. 4C, the gaming system determined that a winning symbol combination is displayed across one wagered pay line. The pay line spans across a horizontal direction of symbol display areas including symbol display areas 410*a*, 410*b*, 410*c*, 410*d*, and 410*e*. In this embodiment, the gaming system displayed five Grape symbols along a horizontal pay line on which the player had placed a wager. Thus, the gaming system determined the five Grape symbols form a winning symbol combination based on a pay table associated with the gaming system. The winning pay line is illustrated as pay line 445 in FIG. 4C across the winning row of reels 402*a*-402*e*.

As noted in FIG. 3B, in one embodiment, the gaming system may also evaluate the generated symbols on reels 402*a*-402*e* for winning scatter symbol combinations. In FIG. 4C, the gaming system determined that three Hat scatter symbols (420*f*, 420*h*, 420*k*) and one Chicken scatter symbol (420*g*) were generated for the play of the game. In one embodiment, due to the unique nature of the scatter symbols described herein, the gaming system may highlight the scatter symbols as shown in FIG. 4C so that player understands that the player may have won extra game features and possibly additional payout awards. It should be appreciated that the gaming system may highlight the scatter symbols in any suitable manner. It should also be appreciated that the gaming system may not highlight the scatter symbols in some embodiments.

In the embodiment illustrated in FIG. 4D, the gaming system evaluated the displayed symbol combinations for winning scatter symbol combinations that result in line pays. In FIG. 4D, the gaming system determined a winning scatter symbol combination is displayed across a wagered pay line. The pay line spans across a horizontal direction of symbol display positions including symbol display positions 410*f*, 410*g*, 410*h*, 410*i*, and 410*j*. In this embodiment, the gaming system displayed three scatter symbols along the horizontal pay line, which the gaming system determined is a winning scatter symbol combination based on the pay table associated with the gaming system and illustrated in FIG. 5. The winning pay line is illustrated as pay line 445 in FIG. 4D across the winning row of reels 402*a*-402*e*.

In one embodiment as illustrated in FIG. 4D, the gaming system further evaluates the displayed symbol combinations for winning scatter symbol combinations for scatter awards. As illustrated in the pay table of FIG. 5, a winning scatter symbol combination is formed when at least three of the same scatter symbols are generated in any three of the symbol display areas 410*a*-410*o*. As illustrated in FIG. 4D, the gaming system determined a winning scatter symbol combination was generated for the play of the game. That is, the gaming system generated three Hat scatter symbols 420*f*, 420*h*, and 420*k* in symbol display areas 410*f*, 410*h*, and 410*k* to form a winning scatter symbol combination. In this embodiment, the Chicken scatter symbol did not contribute toward a winning scatter award. However, it should be appreciated that in some embodiments, Chicken scatter symbols could be combined with the Hat scatter symbols to form a winning scatter award.

Turning to FIG. 4E, the gaming system in one embodiment provides the player with information regarding all of the awards for the play of the game. In this embodiment, the gaming system alerts the player that the player won 7500 credits and 10 free spins in a bonus game. In some embodiments, the gaming system may break down how the player won the credits and free spin bonus game. For example, the gaming system may describe that the five Grape symbols along a wagered pay line pays 7000 credits (e.g., based on the pay table illustrated in FIG. 5). The gaming system may also indicate that Hat symbols and Chicken symbols serve as scatter trigger symbols and symbols that provide payout awards. As illustrated in FIG. 4B-4D, the three Hat scatter symbols appearing anywhere in the symbol display areas triggers a bonus game with 10 free spins. It should be appreciated that the quantity of free spins may be predetermined or randomly generated. In some embodiments, the quantity of awarded free spins may be based on the player's wager, where higher wagers may result in a greater quantity of free spins than lower wagers. It should be appreciated that in some embodiments, the scatter award may include triggering other suitable game features, such as multiplier awards. As illustrated in FIG. 4E, the gaming system may also indicate that a mix of any three Hat symbols or Chicken symbols along a wagered pay line serves to form a winning scatter symbol combination that provides a payout award of 500 credits. It should also be appreciated that the award illustrated in FIG. 4E and FIG. 5 are merely illustrative and could be adjusted to include any suitable awards and different credit amounts. It should be appreciated that scatter symbols in existing games have not included scatter awards and line pay awards. It should further be appreciated that existing games have not included associating winning combinations of mixed scatter symbols with credit awards.

As illustrated in FIG. 4E, the gaming system awards the appropriate number of credits to the player and updates the player's win meter (shown in information area 405*d*) to reflect the player's winnings during the play of the game. In one embodiment, the gaming system may also update the player's credit meter (information area 405*c*) to reflect the player's available credit balance. As illustrated in FIG. 4D, in one embodiment, the credit balance has not yet been updated.

If the player did not win a bonus game, the player may continue the gaming session by playing another game. That is, the player may place another wager and start a new play of the game as noted above. However, continued game play is dependent of the number of credits remaining in the player's credit balance. The player may also choose the cash out. In such an instance, the gaming system provides the player a value based on the player's credit balance using any of the value items discussed above (bills, coins, vouchers, etc.)

FIG. 4F illustrates one embodiment where the player won a bonus game with free spins. In one embodiment, the gaming system may automatically start the bonus game and executes the free spins (to generate a new plurality of symbols for display in the symbol display areas), where each free spin is a play of the bonus game. In one embodiment, the gaming system may automatically continue executing the available free spins until no free spins remain. In one alternative embodiment, the gaming system may enable the player to manually start one or more free spins in the bonus game.

As discussed above, the gaming system may show a display of spinning reels for each of the reels 402*a*-402*e* for a play of the bonus game. The spinning may appear to occur in a vertical top to bottom direction as illustrated with spin direction 440 in FIG. 4A or in a vertical bottom to top direction (not shown), or in a combination of vertical directions (not shown). As illustrated in FIG. 4F, the gaming system randomly generated symbols 420*a*-420*o* from the set of symbols for reels 402*a*-402*e*, respectively. As noted above, the gaming system may rely on random symbol generation performed by a pseudo RNG, a true RNG, or hardware RNG to generate the symbols for the bonus game. In one embodiment, the gaming system may also update the player's credit meter (information area 405*c*) to reflect the player's available credit balance. In the bonus game with free spins, the player's credit meter will generally either increase or remain the same, depending on winning outcomes. However, in some bonus game embodiments, it should be appreciated that the player may use additional credits for some aspect of a bonus game. As shown in FIG. 4F, the player's credit meter (information area 405*c*) was increased by 7500 in accordance with the player's credit award in the base game of FIGS. 4A-4E.

The gaming system displays the generated symbols 420*a*-420*o* in symbol display areas 410*a*-401*o* as illustrated in FIG. 4F. Symbols 420*a*-420*o* displayed on reels 402*a*-402*e* illustrate the randomly generated symbols after the reels have stopped spinning. As illustrated in FIG. 4F, the gaming system randomly generated and displayed symbols 420*a*, 420*f*, and 420*k* in symbol display areas 410*a*, 410*f*, and 410*k* for reel 402*a*. The gaming system also randomly generated and displayed symbols 420*b*, 420*g*, and 420*l* in symbol display areas 410*b*, 410*g*, and 410*l* for reel 402*b*; symbols 420*c*, 420*h*, and 420*m* in symbol display areas 410*c*, 410*h*, and 410*m* for reel 402*c*; symbols 420*d*, 420*i*, and 420*n* in symbol display area 410*d*, 410*i*, and 410*n* for reel 402*d*; symbols 420*e*, 420*j*, and 420*o* in symbol display area 410*e*, 410*j*, and 410*o* for reel 402*e*.

As illustrated in FIG. 4F, the gaming system generated and displayed a King symbol (420*a*), a Bell symbol (420*b*), a Seven symbol (420*c*), a Crown symbol (420*d*), Apple symbols (420*e*, 420*n*), Cherry symbols (420*f*, 420*g*, 420*h*), Chicken symbols (420*i*, 420*l*, 420*m*), a Jack symbol (420*j*), a Hat symbol (420*k*), and a Banana symbol (420*o*) in the game display 400. It should be appreciated that the displayed symbol combinations are merely for explanatory purposes and the gaming system may randomly generate any suitable combination of symbols based on defined symbol sets. In one embodiment, as illustrated in the pay table of FIG. 6, the Hat symbols and the Chicken symbol were designated as scatter symbols. It should be appreciated that any suitable symbol can be designated as a scatter symbol.

Figure 6:
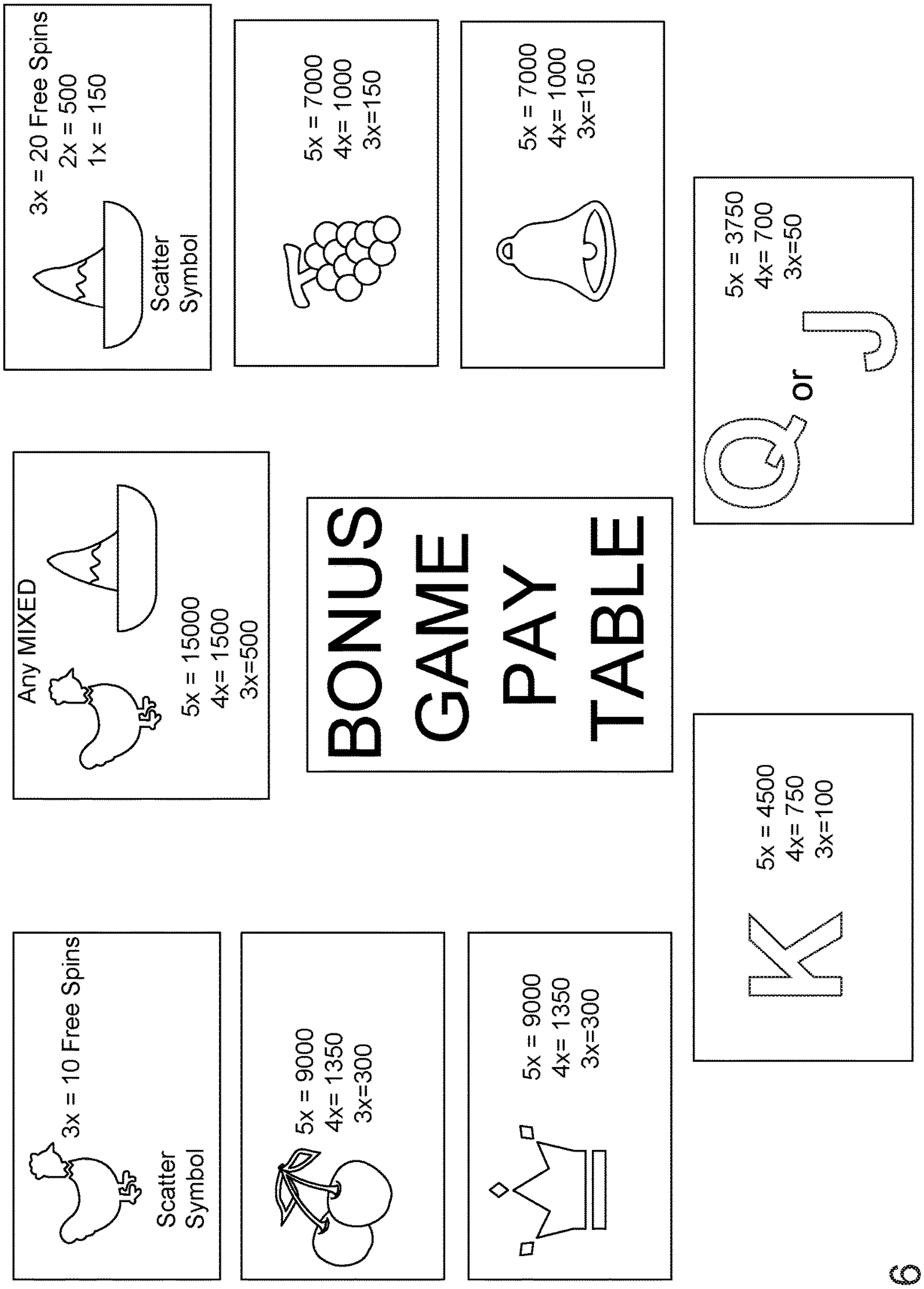
FIG. 6 illustrates one embodiment of a pay table for a bonus game.

For the game illustrated in FIGS. 4A-4H and as shown in the pay table of FIG. 6 (for the bonus game), the scatter symbols trigger the gaming system to provide additional game features when at least three of the same scatter symbols are generated in any three of the symbol display areas 410*a*-410*o*. Since the gaming system is already in the bonus game mode, the scatter symbols do not trigger the gaming system to provide a bonus game, however, the gaming system may provide other suitable awards such as additional free spins, award multipliers, etc. It should be appreciated that any suitable number of scatter symbols may be used to form a winning symbol combination (e.g., one or two scatter symbols).

As shown in FIG. 6, the gaming system also award line payouts (or line pays) when at least three of any scatter symbols are generated in any three adjacent symbol display areas 410*a*-410*o* along a wagered pay line. For example, the gaming system will award a line payout (or line pays) when at least three Hat symbols are generated in three adjacent symbol display areas 410*a*-410*o* along a pay line. In some embodiments, the gaming system will also award a line payout (or line pays) when a mix of any three or more Hat symbols or Chicken symbols are generated in adjacent symbol display areas 410*a*-410*o* along a pay line (e.g., one Hat symbol and two Chicken symbols; two Hat symbols and one Chicken symbol; three Hat symbols and one Chicken symbol, etc.). In one embodiment, the scatter symbols can appear in any order along a pay line to form a winning symbol combination. In some embodiments, the pay table can be structured to require that the gaming system generate the scatter symbols in a certain order to form a winning symbol combination. In some embodiments, as few as one or two scatter symbols may a provide a payout award.

FIG. 4G illustrates one embodiment of a gaming system executing an evaluation of the generated symbols on reels 402*a*-402*e* for winning symbol combinations. As noted above, the player may have wagered on one or more pay lines (such as 10 pay lines shown in information area 405*h*), which will also be used in the bonus game. In one embodiment, at least the wagered on pay lines are evaluated for winning symbol combinations. Any suitable number of pay lines may be used to evaluate winning symbol combinations. In some embodiments, a predetermined or randomly generated set of pay lines may be evaluated for winning symbol combinations in a bonus game.

In the embodiment illustrated in FIG. 4G, the gaming system evaluated the displayed symbol combinations for winning symbol combinations. In FIG. 4G, the gaming system determined a winning symbol combination of non-scatter symbols is displayed across one pay line. The pay line spans across a horizontal direction of symbol display areas including symbol display areas 410*f*, 410*g*, and 410*h*. In this embodiment, the gaming system displayed three Cherry symbols along a horizontal pay line, which the gaming system determined is a winning symbol combination based on a pay table associated with the gaming system from FIG. 6. The winning pay line is illustrated as pay line 455 in FIG. 4G across the row of reels 402*a*-402*e*.

As noted in FIG. 3C, in one embodiment, the gaming system may also evaluate the generated symbols on reels 402*a*-402*e* for winning scatter symbol combinations. In FIG. 4G, the gaming system determined that three Chicken scatter symbols (420*i*, 420*l*, 420*m*) and one Hat scatter symbol (420*k*) were generated for the play of the bonus game. In one embodiment, due to the unique nature of the scatter symbols, the gaming system may highlight the scatter symbols as shown in FIG. 4G so that player understands that the player may have won extra game features and possibly additional payout awards. It should be appreciated that the gaming system may highlight the scatter symbols in any suitable manner. It should also be appreciated that the gaming system may not highlight the scatter symbols in some embodiments.

In the embodiment illustrated in FIG. 4G, the gaming system also evaluated the displayed symbol combinations for winning scatter symbol combinations that result in line pays. In FIG. 4G, the gaming system determined a winning scatter symbol combination is displayed across a pay line. The pay line spans across a horizontal direction of symbol display positions including symbol display positions 410*k*, 410*l*, and 410*m*. In this embodiment, the gaming system displayed three scatter symbols along the horizontal pay line, which the gaming system determined is a winning scatter symbol combination based on the pay table associated with the gaming system and illustrated in FIG. 6. The winning pay line is illustrated as pay line 460 in FIG. 4G across the row of reels 402*a*-402*e*.

In one embodiment as illustrated in FIG. 4G, the gaming system further evaluates the displayed symbol combinations for winning scatter symbol combinations. Winning scatter symbol combinations are associated with scatter awards. As illustrated in the pay table of FIG. 6, a winning scatter symbol combination is formed when at least three of the same scatter symbols are generated in any three of the symbol display areas 410*a*-410*o*. As should be appreciated, winning scatter symbol combinations are formed independent of pay lines and do not require scatter symbols to be in adjacent symbol positions. As illustrated in FIG. 4G, the gaming system determined a winning scatter symbol combination was generated for the play of the bonus game. That is, the gaming system generated three Chicken scatter symbols 420*i*, 420*l*, and 420*m* in symbol display areas 410*i*, 410*l*, and 410*m* to form a winning scatter symbol combination. In this embodiment, the Hat scatter symbol also contributed toward a winning scatter award because a single scatter symbol in one embodiment of the bonus game provides a payout award. However, it should be appreciated that in some embodiments, Chicken symbols could be combined with the Hat symbols to form a winning scatter award.

Turning to FIG. 4H, the gaming system in one embodiment displays information regarding all of the game awards to the player. In this embodiment, the gaming system alerts the player that the player won 950 credits and 10 additional free spins for the bonus game. In some embodiments, the gaming system may break down how the player won the credits and additional free spins. For example, the gaming system may describe that the three Cherry symbols along a pay line pays 300 credits (e.g., based on the pay table illustrated in FIG. 6). The gaming system may also indicate that Hat symbols and Chicken symbols serve as scatter trigger symbols and also as symbols that provide payout awards. As illustrated in FIG. 4G, the three Chicken scatter symbols appearing anywhere in the symbol display areas triggers the gaming system to provide 10 additional free spins. It should be appreciated that the quantity of free spins may be predetermined or randomly generated. In some embodiments, the quantity of awarded free spins may be based on the player's wager, where higher wagers may result in a larger quantity of free spins than lower wagers. It should be appreciated that in some embodiments, the scatter award may include triggering any other suitable game features, such as multiplier awards.

As illustrated in FIG. 4H, the gaming system may also indicate that a mix of any three Hat symbols or Chicken symbols along a wagered pay line serves to form a winning scatter symbol combination that is associated with a line pay or payout award of 500 credits. As also illustrated in FIG. 4H, one Hat scatter symbol generated in any symbol display area pays 150 credits. It should also be appreciated that the award illustrated in FIG. 4H and FIG. 6 are merely illustrative and could be adjusted to include any suitable awards.

As also illustrated in FIG. 4H, the gaming system awards the appropriate number of credits to the player and updates the player's win meter (shown in information area 405*d*) to reflect the player's winnings during the play of the bonus game. In one embodiment, the gaming system may also update the player's credit meter (information area 405*c*) to reflect the player available credit balance. As illustrated in FIG. 4H, in one embodiment, the credit balance has been updated with the base game award (from FIG. 4E and FIG. 4H). In some embodiments, the gaming system does not update the player's credit balance until the bonus game is terminated (whether due to the lack of available free spins or the player's decision to terminate the bonus game early).

If the player does not have additional free spins remaining for the bonus game, the gaming system may return to the base game as illustrated in FIG. 4A. The player may then continue the gaming session by playing another game. That is, the player may place another wager and start a new play of the game as noted above. However, continued game play in the bonus game is dependent of the number of free spins remaining in the player's free spin balance. The player may also choose to terminate the bonus game early and return to the base game or to cash out. If the player decides to cash out, the gaming system provides the player a value based on the player's credit balance using any of the value items discussed above (bills, coins, vouchers, etc.) in one embodiment.

In some embodiments, certain scatter symbols may be available for certain predefined reels. For example, the gaming system may restrict generation of the Hat scatter symbol to certain reels such as reels 1, 3, and 5. That is, in some embodiment, the gaming system may not generate Hat scatter symbols on reels 2 and 4. In one embodiment, the gaming system may restrict generation of the Chicken scatter symbol to certain reels such as reels 2, 3 and 4, while not generating Chicken scatter symbols for reels 1 and 5. It should be appreciated that in some embodiments, scatter symbols are not restricted from being generated on any reels. In some embodiments, the restriction on which reels the gaming system can generate scatter symbols on is limited to the base game or the bonus game. In other embodiments, the restriction on generating scatter symbols can be applied to both the base and bonus games.

In some embodiments, when the gaming system enters a bonus game, the gaming system may be programmed to always generate wild symbols or some other designed symbols on certain reels. For example, in one embodiment, the gaming system may generate all wilds or all of some other designated symbol on reels 1 and 5 at least one, a plurality, or all plays of a bonus game.

In some embodiments, when the gaming system enters a bonus game, the gaming system removes some available symbols from being generated for the symbol display areas on the reels. In one such embodiment, the gaming system will restrict or remove some symbols from being generated so that only higher paying symbols are available to be generated for a play of a bonus game. This allows the player to have increased chances of obtaining higher paying wins during a bonus game. Likewise, in some embodiments, the gaming system will restrict or remove some symbols from being generated so that only lower paying symbols are available to be generated for a play of a bonus game. This may permit the gaming system to give the player an increased number of wins, but with lower payouts.

FIG. 5 illustrates a screen shot of one embodiment of a pay table for a base game of the gaming system. As noted above, it should be appreciated that the pay table is merely illustrative, and the symbols, awards, and the credit values may all be modified in any suitable manner.

FIG. 6 illustrates a screen shot of one embodiment of a pay table for a bonus game of the gaming system. As noted above, it should be appreciated that the pay table is merely illustrative, and the symbols, awards. and the credit values may all be modified in any suitable manner.

By randomly enabling certain designated symbols, like scatter symbols to provide both gaming triggering events and line payouts, the gaming system described herein creates a new level of game element interactions within a game. These new game element interactions also add a new level of anticipation and excitement for game players.

A number of embodiments of the invention have been described. Various modifications may be made without departing from the spirit and scope of the invention. For example, various forms of the flows shown above may be used, with steps re-ordered, added, or removed. Accordingly, other embodiments are within the scope of the following claims.

I claim:

1. A gaming system comprising:
a cabinet;
a processor;
a display device supported by the cabinet;
an input device supported by the cabinet;
a value acceptor supported by the cabinet;
a value dispenser supported by the cabinet;
a memory device that stores a plurality of instructions which, when executed by the processor, cause the processor to:
establish a credit balance based at least in part on a monetary value received by the value acceptor;
place a wager following receipt of a wager input via an input device, the credit balance being decreased by the wager;
cause the display device to display a symbol display area including a plurality of symbols from a set of symbols;
display, on the display device, a plurality of randomly generated symbols from the set of symbols;
determine any credit awards based on non-scatter symbols generated for the symbol display area and the wager;
determine any credit awards based on scatter symbols generated for the symbol display area and the wager;
determine if a bonus game is triggered based on scatter symbols generated for the symbol display area, wherein the bonus game is associated with a pay table that is different from a base game and wherein a smaller predetermined quantity of scatter symbols is associated with a credit award in the bonus game than in the base game;
cause the display device to display any determined awards, the credit balance being increased by any determined credit awards; and
issue value from the value dispenser based on the credit balance upon receipt of a cash out signal via the input device.

2. The gaming system of claim 1, wherein the bonus game further includes a quantity of free spins.

3. The gaming system of claim 2, wherein upon winning a play of the bonus game, the processor further executes another play of the bonus game for each of the quantity of free spins.

4. The gaming system of claim 1, wherein a predetermined quantity of scatter symbols must be generated to win a credit award.

5. The gaming system of claim 4, wherein the predetermined quantity of scatter symbols must be generated in adjacent symbol display areas to win a credit award.

6. The gaming system of claim 4, wherein the predetermined quantity of scatter symbols must be generated in adjacent symbol display areas along a wagered pay line to win a credit award.

7. The gaming system of claim 1, wherein the predetermined quantity of scatter symbols comprises the same scatter symbol to win a credit award.

8. The gaming system of claim 7, wherein the predetermined quantity of scatter symbols comprises at least one different scatter symbol to win a credit award.

9. A method of operating a gaming system, the method comprising:

receiving, by a monetary value acceptor, a monetary value;

establishing, by a processor of the gaming system, a credit balance based at least in part on the received monetary value;

accepting, from an input device in a housing of the gaming system, a wager amount;

decreasing, by the processor, the credit balance by the wager amount;

displaying, on a display device of the housing, a symbol display area including a plurality of randomly generated symbols from a set of symbols;

determining any credit awards based on non-scatter symbols generated for the symbol display area and the wager;

determining any credit awards based on scatter symbols generated for the symbol display area;

determining if a bonus game is triggered based on scatter symbols generated for the symbol display area, wherein the bonus game is associated with a pay table that is different from a base game and wherein a smaller predetermined quantity of scatter symbols is associated with a credit award in the bonus game than in the base game;

displaying, on the display device, any determined awards;

increasing, by the processor, the credit balance by any determined credit awards; and issuing another monetary value, by the value dispenser, based on the credit balance upon receipt of a cash out signal via an input device of the gaming system.

10. The method of operating the gaming system of claim 9, wherein the bonus game further includes a quantity of free spins.

11. The method of operating the gaming system of claim 10, wherein upon winning a play of the bonus game, the processor further executes another play of the bonus game for each of the quantity of free spins.

12. The method of operating the gaming system of claim 9, wherein a predetermined quantity of scatter symbols must be generated to win a credit award.

13. The method of operating the gaming system of claim 12, wherein the predetermined quantity of scatter symbols must be generated in adjacent symbol display areas to win a credit award.

14. The method of operating the gaming system of claim 12, wherein the predetermined quantity of scatter symbols must be generated in adjacent symbol display areas along a wagered pay line to win a credit award.

15. The method of operating the gaming system of claim 9, wherein the predetermined quantity of scatter symbols comprises the same scatter symbol to win a credit award.

16. A non-transitory computer-readable storage medium having machine instructions stored therein, the instructions being executable by a processor to cause the processor to:

establish a credit balance based at least in part on a monetary value received by a value acceptor of a gaming device;

place a wager following receipt of a wager input via an input device, the credit balance being decreased by the wager;

cause a display device to display a symbol display area including a plurality of symbols from a set of symbols;

display, on the display device, a plurality of randomly generated symbols from the set of symbols, wherein each symbol of the set of symbols is associated with a symbol type and wherein the set of symbols includes a plurality of different symbol types;

determine any credit awards based on non-scatter symbols generated for the symbol display area and the wager;

determine any credit awards based on scatter symbols generated for the symbol display area and the wager;

determine if a bonus game is triggered based on scatter symbols generated for the symbol display area, wherein the bonus game is associated with a pay table that is different from a base game and wherein a smaller predetermined quantity of scatter symbols is associated with a credit award in the bonus game than in the base game;

cause the display device to display any determined awards, the credit balance being increased by any determined credit awards; and issue value from a value dispenser based on the credit balance upon receipt of a cash out signal via the input device.

* * * * *